US012316954B2

(12) United States Patent
Shin

(10) Patent No.: US 12,316,954 B2
(45) Date of Patent: May 27, 2025

(54) ELECTRONIC DEVICE INCLUDING PLURALITY OF CAMERAS AND METHOD OF OPERATING THE SAME

(71) Applicant: SAMSUNG ELECTRONICS CO., LTD., Suwon-si (KR)

(72) Inventor: Jaeyoung Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 18/095,191

(22) Filed: Jan. 10, 2023

(65) Prior Publication Data

US 2023/0179856 A1 Jun. 8, 2023

Related U.S. Application Data

(63) Continuation of application No. PCT/KR2022/019796, filed on Dec. 7, 2022.

(30) Foreign Application Priority Data

Dec. 7, 2021 (KR) .......................... 10-2021-0173639
Mar. 28, 2022 (KR) .......................... 10-2022-0038213

(51) Int. Cl.
*H04N 23/63* (2023.01)
*H04N 5/77* (2006.01)

(52) U.S. Cl.
CPC ............. *H04N 23/632* (2023.01); *H04N 5/77* (2013.01)

(58) Field of Classification Search
CPC ........ H04N 23/632; H04N 5/77; H04N 5/772; H04N 23/00; H04N 23/631; H04N 23/635;

(Continued)

(56) References Cited

U.S. PATENT DOCUMENTS 7,249,317 B1 * 7/2007 Nakagawa ......... H04N 1/00448
709/203
11,102,414 B2 8/2021 Bernstein et al.
(Continued)

FOREIGN PATENT DOCUMENTS

CN 110072070 7/2019
CN 111866525 10/2020
(Continued)

OTHER PUBLICATIONS

Search Report and Written Opinion dated Mar. 13, 2023 issued in International Patent Application No. PCT/KR2022/019796.
(Continued)

*Primary Examiner* — Yogesh K Aggarwal
(74) *Attorney, Agent, or Firm* — NIXON & VANDERHYE P.C.

(57) ABSTRACT

An electronic device according to various embodiments includes: a plurality of cameras, a display including a touch input sensor, a memory, and at least one processor operatively connected to the plurality of cameras, the display, and the memory, in which the processor is configured to: play a first video through the display based on a command to play the first video among a plurality of relevant video files having a same time information stored in the memory, receive, via the touch input sensor, a touch input on the display configured to output the first video, determine a second video corresponding to the type of touch input (Continued)

among the plurality of relevant video files, and stop the playing of the first video and play the second video based on playing time information of the stopped first video.

20 Claims, 16 Drawing Sheets

(58) Field of Classification Search
CPC ........ H04N 23/69; H04N 23/90; H04N 23/62; G11B 27/034; G11B 27/34; H04M 1/0241; H04M 2250/22; H04M 2250/52; H04M 1/0214
See application file for complete search history.

(56) References Cited

U.S. PATENT DOCUMENTS

| | | | |
|---|---|---|---|
| 2009/0136222 A1 | 5/2009 | Lee | |
| 2011/0050963 A1* | 3/2011 | Watabe | H04N 23/45 |
| | | | 348/240.2 |
| 2012/0105579 A1 | 5/2012 | Jeon et al. | |
| 2012/0113216 A1 | 5/2012 | Seen et al. | |
| 2014/0232921 A1 | 8/2014 | Kim et al. | |
| 2015/0331942 A1 | 11/2015 | Tan | |
| 2016/0044235 A1* | 2/2016 | Cho | H04M 1/0264 |
| | | | 348/333.05 |
| 2019/0289201 A1* | 9/2019 | Nishimura | H04N 13/239 |
| 2020/0099894 A1 | 3/2020 | Yun et al. | |
| 2021/0084231 A1 | 3/2021 | Lee | |
| 2022/0159183 A1 | 5/2022 | Li et al. | |
| 2023/0115929 A1 | 4/2023 | Bian et al. | |
| 2023/0396886 A1 | 12/2023 | Li et al. | |

FOREIGN PATENT DOCUMENTS

| | | |
|---|---|---|
| CN | 112135198 | 12/2020 |
| CN | 112218174 | 1/2021 |
| CN | 112954214 | 6/2021 |
| CN | 112954218 | 6/2021 |
| CN | 113365012 | 9/2021 |
| CN | 113794829 | 12/2021 |
| EP | 2451178 | 5/2012 |
| JP | 2020-162139 | 10/2020 |
| KR | 10-2012-0046452 | 5/2012 |
| KR | 10-2014-0104748 | 8/2014 |
| KR | 10-2016-0018001 | 2/2016 |
| KR | 10-2019-0075654 | 7/2019 |
| KR | 10-2020-0034528 | 3/2020 |

OTHER PUBLICATIONS

Extended European Search Report for EP Application No. 22904657.8 dated Dec. 16, 2024, 11 pages.

* cited by examiner

ELECTRONIC DEVICE INCLUDING PLURALITY OF CAMERAS AND METHOD OF OPERATING THE SAME

CROSS-REFERENCE TO RELATED APPLICATIONS

This application is a continuation of International Application No. PCT/KR2022/019796 designating the United States, filed on Dec. 7, 2022, in the Korean Intellectual Property Receiving Office and claiming priority to Korean Patent Application No. 10-2021-0173639, filed on Dec. 7, 2021, in the Korean Intellectual Property Office, and to Korean Patent Application No. 10-2022-0038213, filed on Mar. 28, 2022, in the Korean Intellectual Property Office, the disclosures of all of which are incorporated by reference herein in their entireties.

BACKGROUND

Field

The disclosure relates to an electronic device including a plurality of cameras and a method of operating the same, and for example, to an electronic device and a method of operating the same, which shoot a plurality of videos using a plurality of cameras and store and play the plurality of videos.

Description of Related Art

Recently, as cameras in electronic devices such as smartphones have been actively used, there have been developed smartphones including various types of cameras such as ultra-wide-angle cameras, wide-angle cameras, and telephoto cameras disposed on front and/or rear surfaces of the smartphones. The ultra-wide-angle camera refers to a camera including a lens having a wide angle of view of the camera, and the angle of view is about 120 degrees or more. The ultra-wide-angle camera may take a photograph with an angle of view similar to a human visual field. The wide-angle camera refers to a camera including a lens having an angle of view of about 70 to 80 degrees and may be a camera used to take a photograph using a general smartphone. The telephoto camera refers to a camera including a telephoto lens used to take a photograph of a distant subject and may acquire a photograph with high image quality even using the telephoto lens with magnification from about 2× zoom to about 10× zoom or higher.

The electronic device including various cameras may shoot videos by selecting the camera suitable for various subjects and various shooting environments.

There may be a user need to simultaneously create and store a plurality of videos at the same time using an electronic device including a plurality of cameras and play the plurality of videos or change and play the plurality of videos.

SUMMARY

Embodiments of the disclosure may provide an electronic device that serves to simultaneously shoot a plurality of videos using various types of cameras and store the plurality of videos.

Embodiments of the disclosure may provide an electronic device that serves to play the plurality of videos having the same time information.

According to various example embodiment of the disclosure, a method of creating a video of an electronic device including a plurality of cameras includes: displaying preview images of images acquired by at least some of the plurality of cameras on a part of a display screen; receiving a touch input in a region in which first and second images are displayed among the plurality of preview images; simultaneously acquiring first and second videos using a first camera configured to acquire the preview image displayed in the first image and a second camera configured to acquire the preview image displayed in the second image region; and separately storing the first and second videos as first and second relevant files having a same time information.

According to various embodiments of the disclosure, a method of playing a video of an electronic device including a display includes: playing a first video through the display based on a command to play the first video among a plurality of relevant video files having a same time information; receiving a touch input on the display configured to output the first video; determining a second video corresponding to the type of touch input among the plurality of relevant video files; and stopping the playing of the first video and playing the second video based on playing time information of the stopped first video.

An electronic device according to various example embodiments includes: a plurality of cameras; a display including a touch input sensor; a memory; and at least one processor operatively connected to the plurality of cameras, the display, and the memory, wherein the processor is configured to: control the display to display preview images of images acquired by at least some of the plurality of cameras on a part of a display screen; receive, by the touch input sensor, a touch input in a region in which first and second images are displayed among the plurality of preview images; simultaneously acquire first and second videos using a first camera configured to acquire the preview image displayed in the first image and a second camera configured to acquire the preview image displayed in the second image region; and separately store the first and second videos as first and second relevant files having a same time information in the memory.

The electronic device according to various example embodiments of the present disclosure may simultaneously shoot the plurality of videos using various types of cameras and store the plurality of videos as a single file or different files.

According to various example embodiments of the present disclosure, the electronic device may change one video being played to another video and play another video without interruption based on the playing time information of the plurality of videos having the same time information.

In addition, various effects that can be directly or indirectly identified through the present disclosure may be provided.

BRIEF DESCRIPTION OF THE DRAWINGS

In connection with the description of the drawings, the same or similar reference numerals may be used for the same or similar components. Further, the above and other aspects, features and advantages of certain embodiments of the present disclosure will be more apparent from the following detailed description, taken in conjunction with the accompanying drawings, in which.

DETAILED DESCRIPTION

Figure 1:
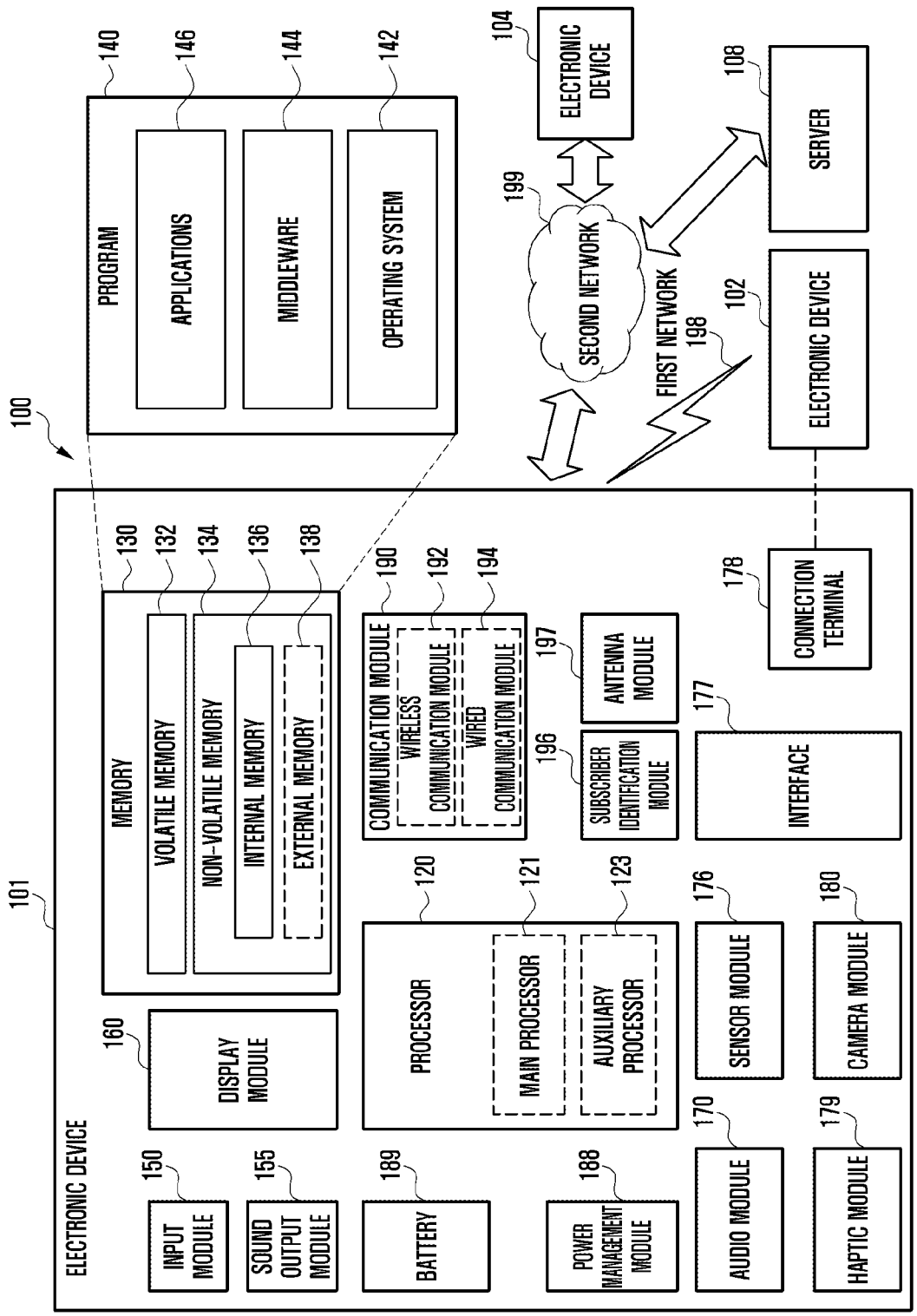
FIG. 1 is a block diagram illustrating an example electronic device in a network environment according to various embodiments.

FIG. 1 is a block diagram illustrating an example electronic device 101 in a network environment 100 according to various embodiments. With reference to FIG. 1, the electronic device 101 in the network environment 100 may communicate with an electronic device 102 via a first network 198 (e.g., a short-range wireless communication network) or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation operations. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, in the case that the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part, of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101, where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof but it is not limited thereto. The artificial intelligence model may, additionally or alternatively, include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing a recording. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board or adjacent to the first surface and capable of supporting a designated high-frequency band (e.g., the mmWave band), and a plurality of antennas (e.g., array antennas) disposed on a second surface (e.g., the top or a side surface) of the printed circuit board or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic device 102 or 104 may be a device of the same type as, or a different type from, the electronic device 101. According to an embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C" may include any one of, or all possible combinations of, the items enumerated together in a corresponding one of the phrases. As used herein, such terms as "1st" and "2nd" or "first" and "second" may be used to simply distinguish a corresponding component from another, and they do not limit the components in other aspects (e.g., importance or order). It is to be understood that if an element (e.g., the first element) is referred to, with or without the term "operatively" or "communicatively," as "coupled with," "coupled to," "connected with," or "connected to" another element (e.g., the second element), the element may be coupled with the other element directly (e.g., wiredly), wirelessly, or via a third element.

Also embodiments disclosed in the disclosure and drawings of this disclosure are merely presented as examples to easily explain the technical content according to the various example embodiments of the disclosure and aid in the understanding of the various example embodiments of the disclosure, but they are not intended to limit the scope of the embodiments of the disclosure. Therefore, all changes or modifications derived from the technical idea of the various embodiments of the disclosure should be interpreted to be included in the scope of the various embodiments of the disclosure in addition to the embodiments disclosed herein.

Figure 2A:
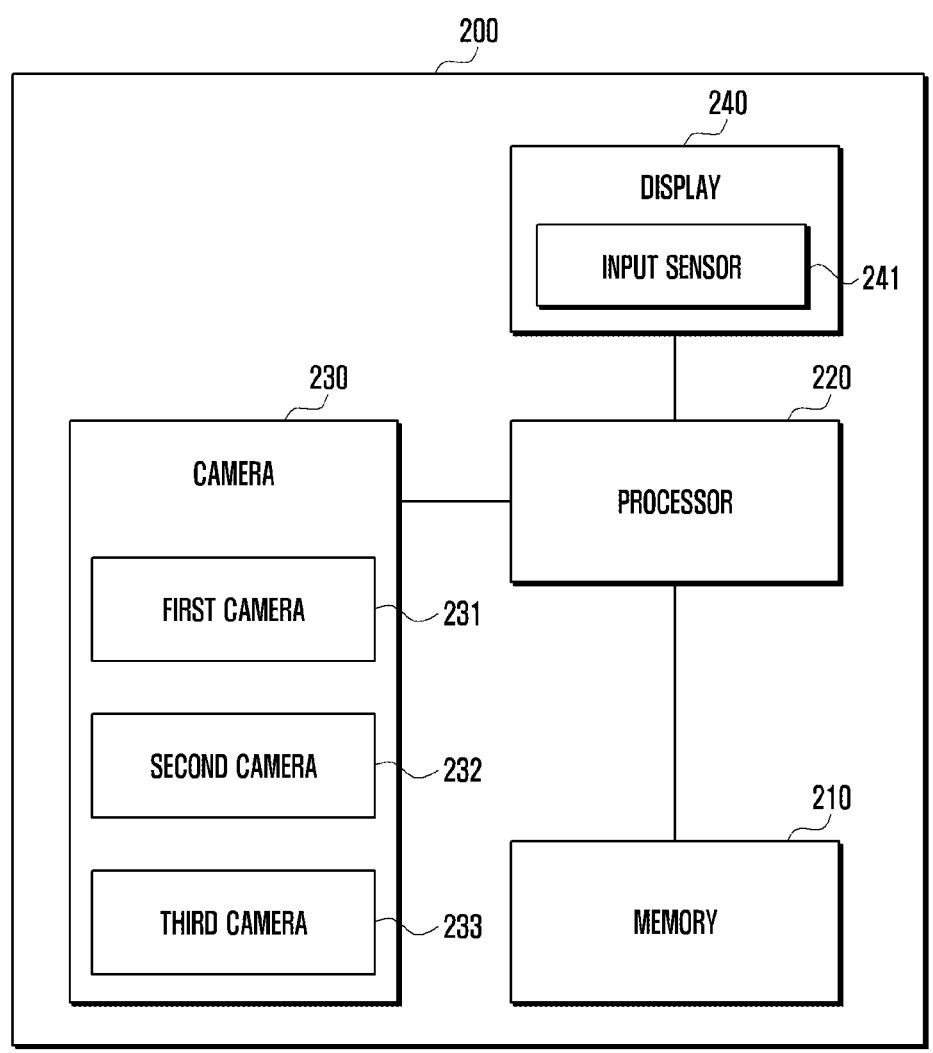
FIG. 2A is a block diagram illustrating an example configuration of the electronic device according to various embodiments.

FIG. 2A is a block diagram illustrating an example configuration of an electronic device 200 (e.g., the electronic device 101 in FIG. 1) according to various embodiments. The electronic device 200 in FIG. 2 may include various electronic devices such as smartphones and tablets, for example. For example, the electronic device 200 may include various shapes such as a bar shape, a foldable structure (e.g., a foldable phone), and a rollable structure (e.g., a rollable phone). The shape of the electronic device 200 is not limited to examples disclosed hereinafter.

With reference to FIG. 2A, the electronic device 200 may include a memory 210 (e.g., the memory 130 in FIG. 1), a processor (e.g., including processing circuitry) 220 (e.g., the processor 120 in FIG. 1), cameras 230 (e.g., the camera 180 in FIG. 1), and/or a display 240 (e.g., the display module 160 in FIG. 1). The elements included in FIG. 2A are some of the components included in the electronic device 200, and the electronic device 200 may include various elements illustrated in FIG. 1 in addition to the elements.

The cameras 230 according to various embodiments may include a plurality of cameras including a first camera 231 (e.g., the camera 180 in FIG. 1), a second camera 232 (e.g., the camera 180 in FIG. 1), and a third camera 233 (e.g., the camera 180 in FIG. 1). In this example, the cameras 230 are illustrated as including the three cameras (e.g., the first camera 231, the second camera 232, and the third camera 233), but this is an example. Embodiments of the present disclosure are not limited thereto and may include four or more cameras. The plurality of cameras including the first camera 231, the second camera 232, and the third camera 233 may be implemented as one or more modules, for example, modules separated from one another. Even in the case in which the plurality of cameras are implemented as the modules separated from one another, the plurality of cameras including the first camera 231, the second camera 232, and the third camera 233 may be mounted at various positions including the same surface and/or different surfaces of a housing of the electronic device 200.

Figure 2B:
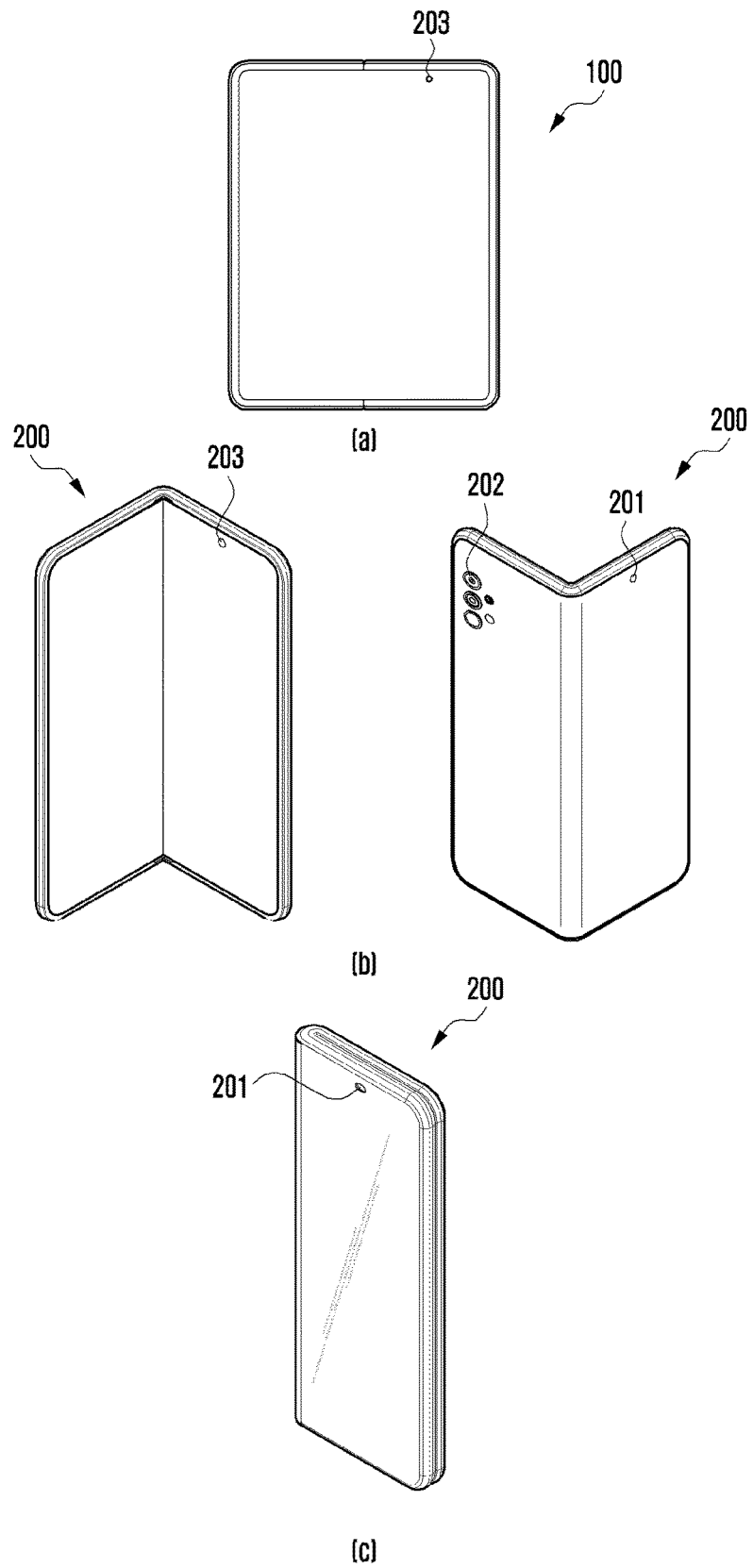
FIG. 2B is a diagram illustrating an example in which the electronic device is implemented in the form of a foldable phone according to various embodiments.

FIG. 2B is a diagram illustrating an example in which the electronic device 200 is implemented in the form of a foldable phone according to various embodiments. According to various embodiments, the electronic device 200 may also be implemented in the form of a foldable phone in addition to a general bar-type smartphone. In the case in which the electronic device 200 is implemented in the form of a foldable phone as illustrated in FIG. 2B, the plurality of cameras (e.g., the first camera 231, the second camera 232, and the third camera 233 in FIG. 2A) may include front and rear cameras 201 and 202 exposed to the outside when the electronic device is folded, and/or an internal camera 203 folded inward when the electronic device is folded. The plurality of cameras may be mounted on different surfaces or positions. According to an embodiment, based on a folded angle of the electronic device 200 in the form of a foldable phone, directions in which the front camera 201 and the rear camera 202 capture images may include, for example, the same direction at the different positions in an unfolded state (a), the leftward or rightward direction at an intermediate angle in a folded state (b) at the intermediate angle (e.g., an angle of 90 degrees) between the unfolded state and the folded state, and the forward and rearward directions at an angle of 180 degrees in the folded state (c) at an angle of 180 degrees. The electronic device may capture images at various angles and positions and/or in various directions. In addition, an image capturing direction of the internal camera 203 may vary depending on image capturing directions of the front and rear cameras 201 and 202. The internal camera cannot capture images in the folded state.

The first camera 231 according to various embodiments may include at least one of an ultra-wide-angle camera, a wide-angle camera, a first telephoto camera, and a second telephoto camera.

The ultra-wide-angle camera (ultra-wide camera) may be a camera including an ultra-wide-angle lens and used to capture an image of a nearby subject. The ultra-wide-angle camera may be a camera having the widest angle of view among the cameras included in the electronic device 200.

The wide-angle camera (wide camera) may be a camera including a wide-angle lens and used to capture an image of a nearby subject. The wide-angle camera may be a camera having the second-widest angle of view among the cameras included in the electronic device 200.

The first telephoto camera (tele-camera) may be a camera including a telephoto lens capable of capturing an image with N1 magnification and used to capture an image of a distant subject. The first telephoto camera may be a camera having the second-narrowest angle of view among the cameras included in the electronic device 200.

The second telephoto camera (tele-camera) may be a camera including a telephoto lens capable of capturing an image with N2 magnification and used to capture an image of a distant subject. The second telephoto camera may be a camera having the narrowest angle of view among the cameras included in the electronic device 200.

The second camera 232 according to various embodiments may include at least one of the ultra-wide-angle camera, the wide-angle camera, the first telephoto camera, and the second telephoto camera. The second camera 232 may be implemented as a camera disposed on the electronic device 200, provided at a position different from the positions of the first camera 231 and the third camera 233, and having a different angle of view from the first camera 231 and the third camera 233.

The third camera 233 according to various embodiments may include at least one of the ultra-wide-angle camera, the wide-angle camera, the first telephoto camera, and the second telephoto camera. The third camera 233 may be implemented as a camera disposed on the electronic device 200, provided at a position different from the positions of the first camera 231 and the second camera 232, and having a different angle of view from the first camera 231 and the second camera 232.

The positions on the electronic device 200 at which the plurality of cameras including the first camera 231, the second camera 232, and the third camera 233 according to various embodiments are disposed may include, but are not limited to, various positions directed toward the front and rear sides of the electronic device 200. For example, the first and second cameras 231 and 232 may be implemented as front cameras, and the third camera 233 may be implemented as a rear camera. For example, the cameras may be implemented as three front cameras (the first to third cameras 231, 232, and 233) and two rear cameras (not illustrated) (e.g., cameras identical or similar to the second and third cameras 232 and 233).

As described above, in the case in which the plurality of cameras including the first camera 231, the second camera 232, and the third camera 233 are implemented as the front camera 201, the rear camera 202, and/or the internal camera 203 of the foldable electronic device 200 as illustrated in FIG. 2B, the respective cameras may capture various images at different angles and positions and/or in different directions as described above. In this case, a file including captured images may include information on image capturing angles, positions, and/or directions as additional information.

According to various embodiments, the display 240 may include an input sensor 241. The input sensor 241 may include a touch sensor set to detect a touch, a hovering sensor set to detect hovering, or a pressure sensor set to measure intensity of a force generated by the touch. The input sensor 241 may detect a touch input including touching or hovering and thus transmit a detection signal to the processor 220.

According to various embodiments, the display 240 may display contents, icons, and menus including various texts and images and perform various operations corresponding to the touch input detected by the input sensor 241.

According to various embodiments, the processor 220 may include various processing circuitry and provide user interfaces for simultaneously capturing and storing a plurality of images by executing an application using the cameras, for example, an image capturing application. For example, an image capturing mode (hereinafter, referred to as a simultaneous image capturing mode) for simultaneously capturing and storing the plurality of images may be selected through a setting menu of the camera or a menu (e.g., toggle switch) provided on the image capturing application.

According to various embodiments, the processor 220 may provide a user interface for selecting the two or more cameras that are to capture images in accordance with the simultaneous image capturing mode among the plurality of cameras. For example, the processor 220 may display an icon for selecting the two or more cameras among the plurality of cameras including the first camera 231, the second camera 232, and the third camera 233. For example, the processor 220 may display preview images, which are related to images inputted from the plurality of cameras including the first camera 231, the second camera 232, and the third camera 233, as thumbnails on the display 240, for example. For example, the processor 230 may allow the two or more cameras selected from the plurality of thumbnail preview images to capture images.

According to various embodiments, the processor 220 may process, in real time, two or more camera images, which are captured at the same start point in time and the same end point in time in the simultaneous image capturing mode, and store the two or more camera images as relevant independent image files or integrate and store the two or more camera images as a single file in accordance with image formats in the memory 210. The case in which the two or more camera images are stored as the plurality of independent image files will be described in greater detail below, but the embodiments are not limited thereto. The case in which the two or more camera images are integrated and stored as the single file may also apply.

According to various embodiments, at the time of saving an image file, the processor 220 may store, as additional file information, various pieces of information such as camera information including image capturing information on a corresponding image, for example, information on an angle of view or information on a position of the camera (including an image capturing angle and/or an image capturing direction). In addition, the processor 220 may store, as additional file information, information on a delimiter or identifier that indicates interrelationships of the image files. The additional information such as time information on the image file, information on the angle of view or position of the camera, information on the image capturing angle and/or direction, and information on the interrelationship may be stored as attachment and/or separate files in the respective image files in the memory 210. For example, image capturing information (e.g., front 'Directorsview_Front', wide-angle 'Directorsview_Wide') such as camera position information and view angle information, together with storage positions (paths) of the respective images, may be stored in a separate management information storage file such as a content management hub of the memory 210.

According to various embodiments, the processor 220 may display the two or more images stored as relevant files on the display 240 by executing an application for playing images (e.g., a gallery application or a video playing application) and play the image of the file selected from the two or more image files on the display 240. For example, the processor 220 may indicate that the two or more image files are related to one another at the time of displaying the relevant two or more image files on the display 240. For example, the processor 22 may display the indication of the relevant files in various ways such as displaying of an icon indicating the simultaneous image capturing mode and/or an icon including serial numbers on thumbnails indicating the corresponding files and/or displaying of thumbnails grouped in a single rim or box.

According to various embodiments, the processor 220 may receive a control signal through the display 240 including the input sensor 241, the control signal including a command to select, play, and stop one video file from the plurality of relevant video files or change the video file into another video file.

According to various embodiments, the processor 220 may play the file selected from the two or more relevant image files through the display 240 and indicate that the played image is an image captured in the simultaneous image capturing mode and another simultaneously captured image may be present. For example, the processor 220 may play the selected image file on a large screen or an entire screen through the display 240 and display another image file in the form of a preview in a small screen such as a thumbnail on a part of the large screen. For example, the processor 220 may display the icon indicating the simultaneous image capturing mode or provide a carousel graphic user interface at an upper end of the screen (e.g., it is possible to display the presence of the plurality of files by displaying, one by one at one time, images and/or texts indicating the plurality of files in the same space) while playing the selected image file on the large screen or the entire screen through the display 240, thereby indicating that there is another simultaneously captured image file.

According to various embodiments, when the processor 220 receives the command to change the file selected from the two or more image files into another file while playing the file selected from the two or more relevant image file in accordance with the time information, the processor may stop the playing of the image file being played and play an image of another file in accordance with playing time information of the stopped image file. For example, when a playing time at a point in time at which the conversion command is received while the image file is played is 15 seconds after the start time, the processor 220 may stop the playing of the image file being played at a point of 15 seconds in response to the conversion command and play another image file continuously from the point of 15 seconds.

Figure 3:
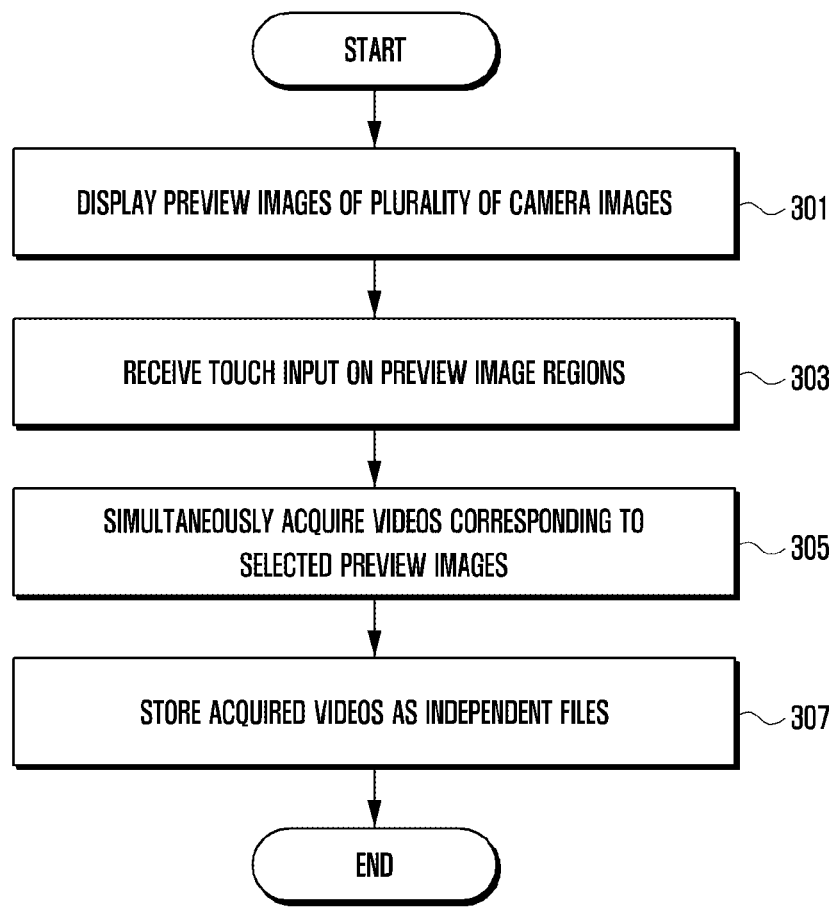
FIG. 3 is a flowchart illustrating an example method of storing a plurality of videos of the electronic device according to various embodiments.

FIG. 3 is a flowchart illustrating an example method of simultaneously shooting and storing a plurality of videos by the processor 220 (e.g., the processor 220 in FIG. 2) of the electronic device (e.g., the electronic device 200 in FIG. 2) according to various embodiments.

According to various embodiments, when the processor 220 executes a camera image capturing application and the simultaneous image capturing mode is selected, the processor 220 may display a selectable indicator or preview images indicating the plurality of cameras (e.g., the first camera 231, the second camera 232, and/or the third camera 233 in FIG. 2) in operation 301. For example, the processor 220 may display, as the selectable indicator, the images or the preview screens of the images captured by the plurality of cameras and provided in the form of icons or thumbnails indicating the plurality of cameras.

According to various embodiments, in operation 303, the processor 220 may receive touch inputs in two or more regions of the plurality of camera preview images. For example, the touch input in the preview image region may include a touch input such as sliding or double clicks.

According to various embodiments, in operation 305, the processor 220 may simultaneously acquire videos corresponding to the two or more preview images selected based on the touch input. For example, the processor 220 may simultaneously create two or more videos having the same start point in time and the same end point in time by simultaneously operating the two or more cameras for capturing the selected two or more preview images.

According to various embodiments, in operation 307, the processor 220 may store, as independent files, the videos acquired by the two or more cameras. For example, at the time of saving an image file, the processor 220 may store, as additional file information, various pieces of information such as camera information including image capturing information on a corresponding image, for example, information on an angle of view. In addition, the processor 220 may store, as additional file information, information on a delimiter or identifier that indicates interrelationships of the image files.

Figure 4:
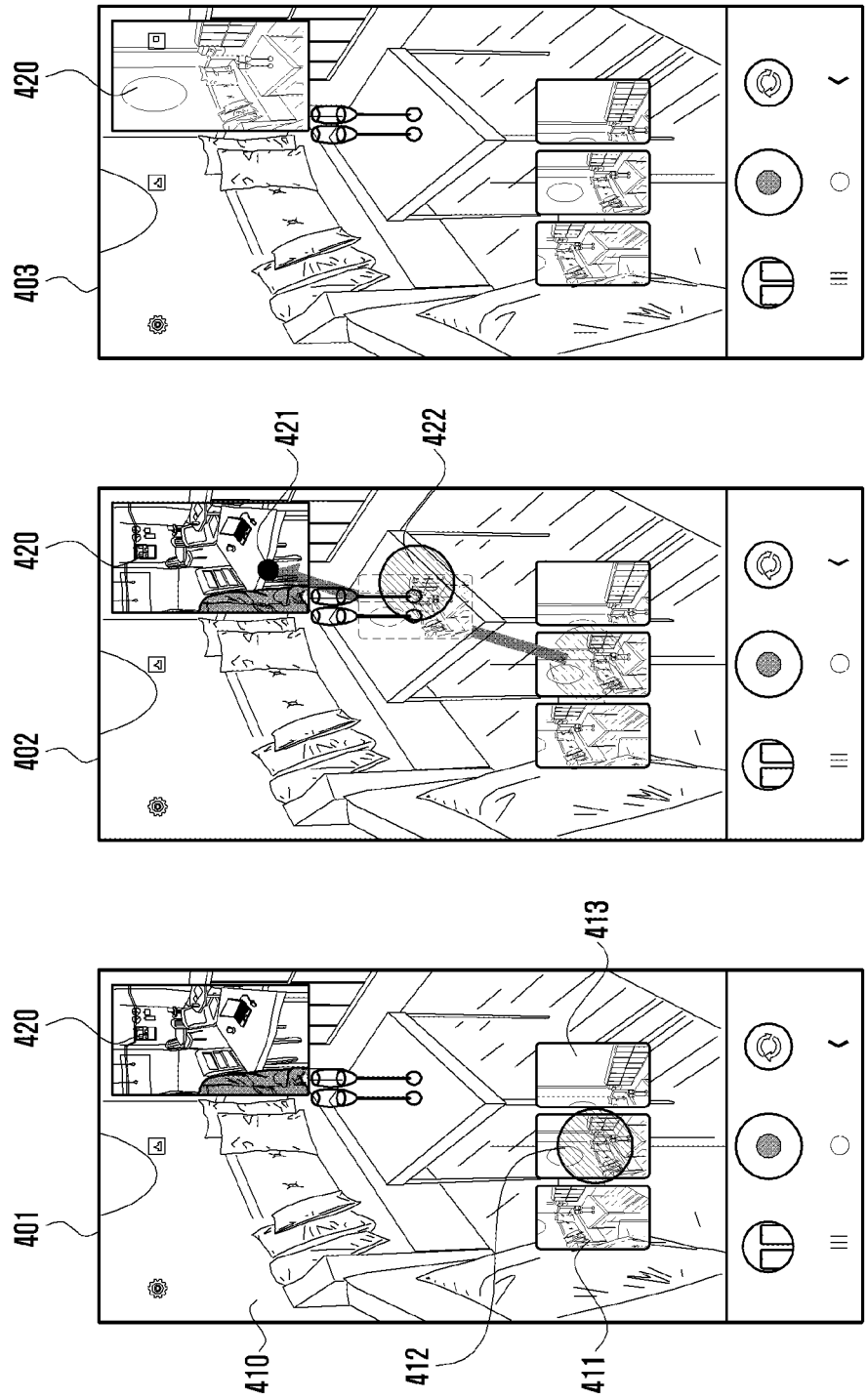
FIGS. 4, 5, 6 and 7 are diagrams illustrating examples of user interfaces for storing a plurality of videos of the electronic device according to various embodiments.

FIG. 4 is a diagram illustrating an example of a user interface for simultaneously capturing and storing a plurality of images in accordance with the simultaneous image capturing mode of the electronic device (e.g., the electronic device 200 in FIG. 2A or 2B) according to various embodiments.

With reference to FIG. 4, when the camera image capturing application is executed and the simultaneous image capturing mode is selected in accordance with the user's request, a first screen 410, which is a real-time preview image, is displayed as an entire screen, as illustrated in a screen 401, and a second screen 420 may be displayed in the form of picture-in-picture (PIP), for example, of a part of the first screen 410. For example, the first screen 410 may indicate an image captured by the rear camera, e.g., the front camera positioned on the rear surface of the electronic device and configured to capture an image of a portion disposed forward of the electronic device, and the second screen 420 may indicate an image captured by the front camera, e.g., the rear camera positioned on the front surface of the electronic device and configured to capture an image of a portion disposed rearward of the electronic device. However, various embodiments are not limited thereto. The positions of the cameras indicating the first and second screens 410 and 420 may be changed depending on the setting and may be variously changed in accordance with the touch input.

According to an embodiment, the processor 220 may display the preview screens of the images, which are captured by the plurality of available cameras (e.g., the first camera 231, the second camera 232, and the third camera 233 in FIG. 2A) in the simultaneous image capturing mode, in the form of icons or thumbnails (e.g., a first video 411, a second video 412, and a third video 413). Therefore, the user may check the preview images of the images captured by the plurality of cameras and select the two or more cameras.

According to an embodiment, in the case in which the electronic device 200 is foldable as illustrated in FIG. 2B, the processor 220 may allow the plurality of cameras (e.g., the front camera 201, the rear camera 202, and the internal camera 203 in FIG. 2B) to capture images in accordance with the folded state as described above, and the processor 220 may display image the capturing positions, angles, and/or directions of the cameras in accordance with the folded state of the electronic device 200, together with the preview screens of the captured images.

According to an embodiment, when the image capturing icon is selected in the state in which the screen 401 is displayed, image capturing processes may be simultaneously performed by the camera (e.g., the first camera 231) for capturing the preview image of the first screen 410 illustrated in the screen 401 and the camera (e.g., the third camera 233) for capturing the preview image of the second screen 420.

According to an embodiment, the user may select the two or more cameras to be used in the simultaneous image capturing mode in response to various touch inputs such as sliding or double clicks. For example, the user may select the second camera 232 by selecting the second video 412 in response to various touch inputs such as sliding or double clicks. For example, referring to the screen 402, the second camera 232 may be selected as the user touches the second video 412, slides 422 the second video while maintaining the touch, and releases the second video in a region 421 of the second screen 420. Therefore, referring to screen 403, it can be seen that the preview image displayed on the second screen 420 is changed to the second video 412.

According to an embodiment, when the image capturing icon is selected in the state in which the screen 403 is displayed, image capturing processes may be simultaneously performed by the camera (e.g., the first camera 231) for capturing the preview image of the first screen 410 illustrated in the screen 403 and the camera (e.g., the second camera 232) for capturing the preview image of the second screen 420.

According to an embodiment, when the second video 412 is slid 422 but is released out of the region of the second screen 420, the second screen 420 may return to the previous screen 401 without being changed to the second video 412.

Figure 5:
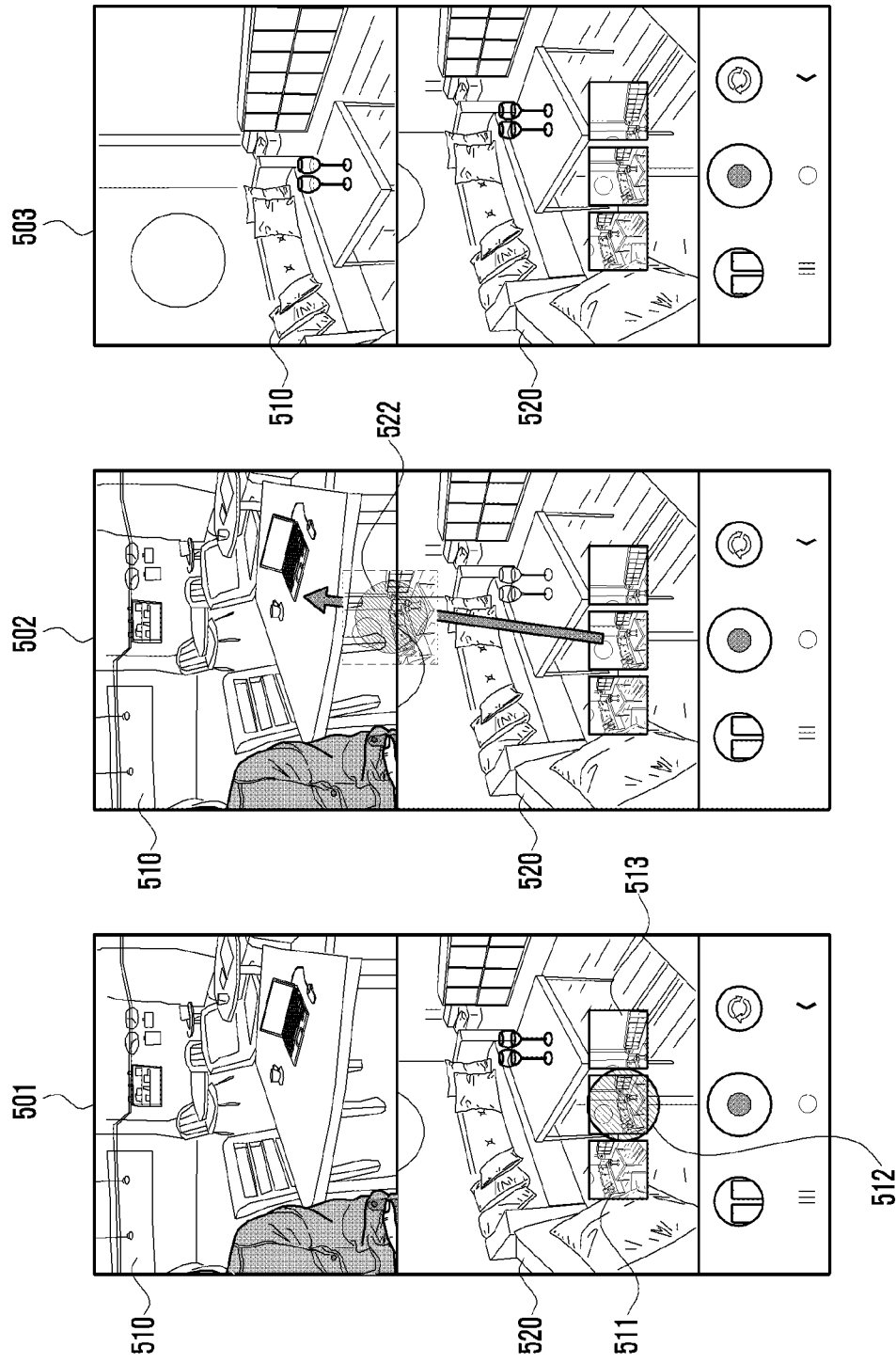

FIG. 5 is a diagram illustrating an example of a user interface for simultaneously capturing and storing a plurality of images in accordance with the simultaneous image capturing mode of the electronic device (e.g., the electronic device 200 in FIG. 2A or 2B) according to various embodiments.

With reference to FIG. 5, when the camera image capturing application is executed and the simultaneous image capturing mode is selected in accordance with the user's request, the entire screen may be divided into a plurality of screens, and for example, one side first screen 510, which is a real-time preview image, and the other side second screen 520 may be displayed, as illustrated in a screen 501. For example, the first screen 510 may indicate an image captured by the rear camera, e.g., the camera positioned on the rear surface of the electronic device and configured to capture an image of a portion disposed forward of the electronic device, and the second screen 520 may indicate an image captured by the front camera, e.g., the camera positioned on the front surface of the electronic device and configured to capture an image of a portion disposed rearward of the electronic device. However, various embodiments are not limited thereto. The positions of the cameras indicating the first and second screens 510 and 520 may be changed depending on the setting up and may be variously changed in accordance with the touch input.

According to an embodiment, the processor 220 may display the preview screens of the images, which are captured by the plurality of available cameras (e.g., the first camera 231, the second camera 232, and the third camera 233 in FIG. 2) in the simultaneous image capturing mode, in the form of icons or thumbnails (e.g., a first video 511, a second video 512, and a third video 513). Therefore, the user may identify the preview images of the images captured by the plurality of cameras and select the two or more cameras.

According to an embodiment, when the image capturing icon is selected in the state in which the screen 501 is displayed, image capturing processes may be simultaneously performed by the camera (e.g., the first camera 231) for capturing the preview image of the first screen 510 illustrated in the screen 501 and the camera (e.g., the third camera 233) for capturing the preview image of the second screen 520.

According to an embodiment, the user may select the two or more cameras to be used in the simultaneous image capturing mode in response to various touch inputs such as sliding or double clicks. For example, the user may select the second camera 232 by selecting the second video 512 in response to various touch inputs such as sliding or double clicks. For example, with reference to the screen 502, the second camera 232 may be selected as the user touches the second video 512, slides 522 the second video while maintaining the touch, and releases the second video in a region of the first screen 510. Therefore, with reference to screen 503, it can be seen that the preview image displayed on the first screen 510 is changed to the second video 512.

According to an embodiment, when the image capturing icon is selected in the state in which the screen 503 is displayed, image capturing processes may be simultaneously performed by the camera (e.g., the first camera 231) for capturing the preview image of the first screen 510 illustrated in the screen 503 and the camera (e.g., the second camera 232) for capturing the preview image of the second screen 520.

According to an embodiment, when the second video 512 is selected and slid in the second screen 502 and released in a region of the second screen 520, the second screen 520 may be changed to the second video 512.

Figure 6:
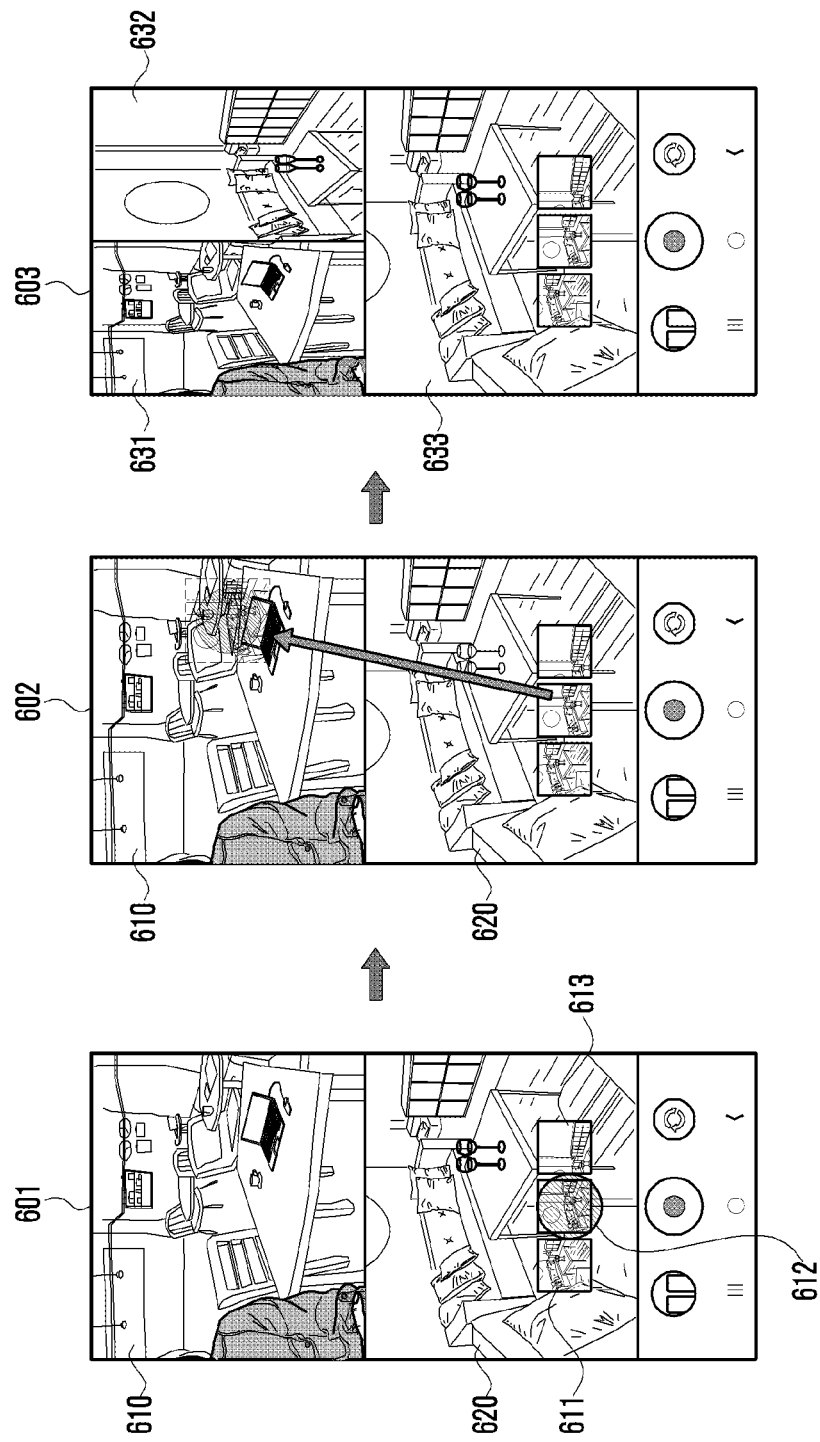

FIG. 6 is a diagram illustrating an example of a user interface for simultaneously capturing and storing a plurality of images in accordance with the simultaneous image capturing mode of the electronic device (e.g., the electronic device 200 in FIG. 2A or 2B) according to various embodiments.

With reference to FIG. 6, when the camera image capturing application is executed and the simultaneous image capturing mode is selected in accordance with the user's request, the entire screen may be divided into a plurality of screens, and for example, an upper side first screen 610, which is a real-time preview image, and a lower side second screen 620 may be displayed, as illustrated in a screen 601. For example, the first screen 610 may indicate an image captured by the rear camera, e.g., the camera positioned on the rear surface of the electronic device and configured to capture an image of a portion disposed forward of the electronic device, and the second screen 620 may indicate an image captured by the front camera, e.g., the camera positioned on the front surface of the electronic device and configured to capture an image of a portion disposed rearward of the electronic device. However, various embodiments are not limited thereto. The angles of view or positions of the cameras indicating the first and second screens 610 and 620 may be changed depending on the setting and may be variously changed in accordance with the touch input.

According to an embodiment, the processor 220 may display the preview screens of the images, which are captured by the plurality of available cameras (e.g., the first camera 231, the second camera 232, and the third camera 233 in FIG. 2) in the simultaneous image capturing mode, in the form of icons or thumbnails (e.g., a first video 611, a second video 612, and a third video 613). Therefore, the user may check the preview images of the images captured by the plurality of cameras and select the two or more cameras.

According to an embodiment, if the image capturing icon is selected in the state in which the screen 601 is displayed, image capturing processes may be simultaneously performed by the camera (e.g., the first camera 231) for capturing the preview image of the first screen 610 illustrated in the screen 601 and the camera (e.g., the third camera 233) for capturing the preview image of the second screen 620.

According to an embodiment, the user may select the three cameras to be used in the simultaneous image capturing mode by the sliding input. For example, when the user selects the second video 612 in response to a sliding input, slides the second video 612, and releases the second video 612 in a right region of the first screen 610 as illustrated in a screen 602, a region of the first screen 610 is divided into two left and right regions, such that the first video 611, which has been displayed in the previous first screen 610, may be displayed on a left third screen 631, and the second video 612 may be displayed on a right fourth screen 632 in which the second video 612 is released.

According to an embodiment, when the image capturing icon is selected in the state in which the screen 603 is displayed, three videos may begin to be shot by the camera (e.g., the first camera 231) for capturing the preview image of the third screen 631 illustrated in the screen 603, the camera (e.g., the second camera 232) for capturing the preview image of the fourth screen 632, and the camera (e.g., the third camera 233) for capturing the preview image of the second screen 633.

According to an embodiment, the captured images may be stored as the same single file or separate files. In this case, attributes of the respective captured images (e.g., angles of view, positions, image capturing angles, and/or direction of the captured camera) may also be stored as additional information.

Figure 7:
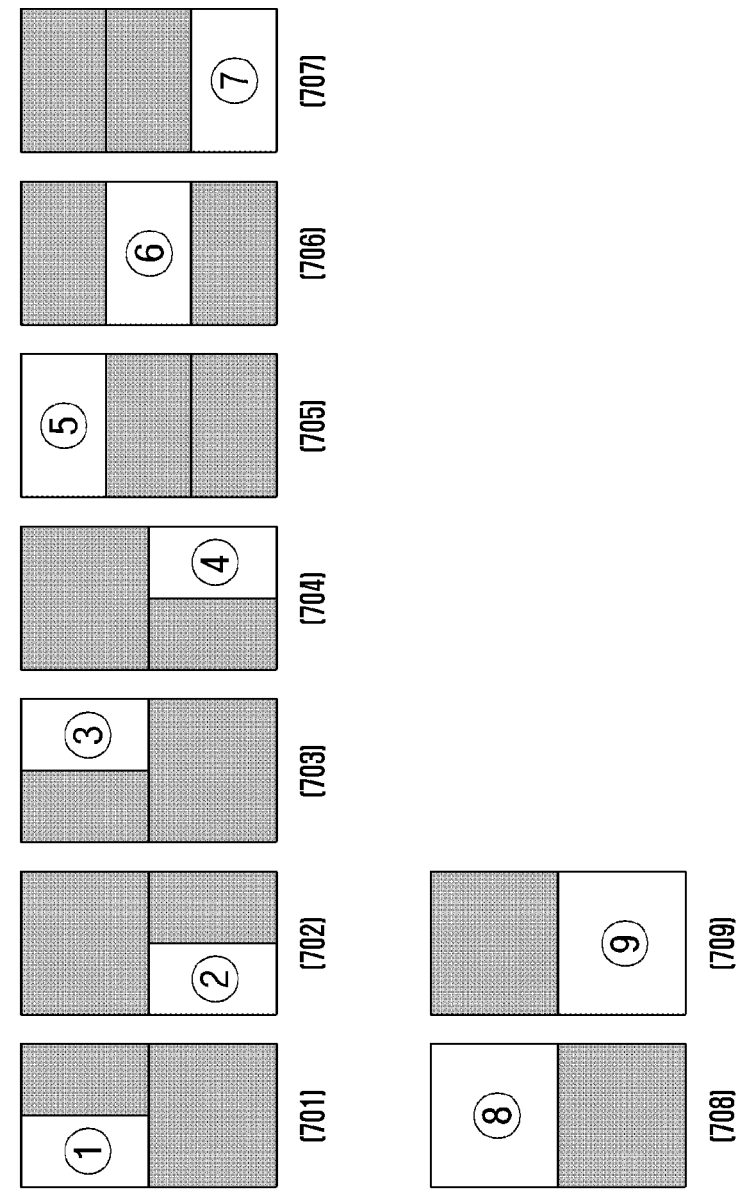
Figure 7:
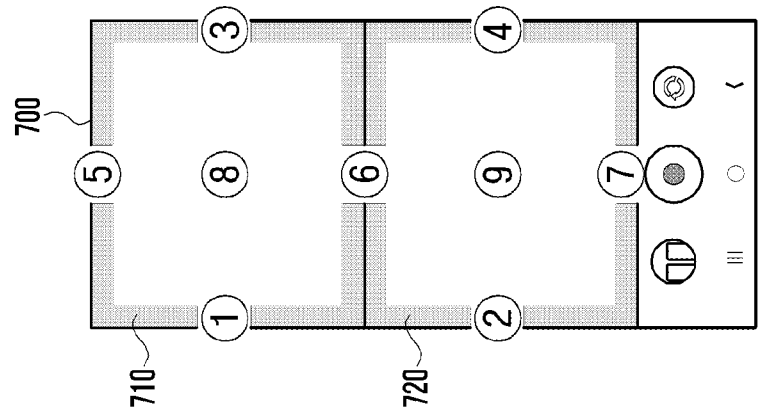

FIG. 7 is a diagram illustrating an example of a user interface for simultaneously capturing and storing a plurality of images in accordance with the simultaneous image capturing mode of the electronic device (e.g., the electronic device 200 in FIG. 2A or 2B) according to various embodiments.

With reference to FIG. 7, when the camera image capturing application is executed and the simultaneous image capturing mode is selected in accordance with the user's request, the entire screen may be divided into a plurality of screens, and for example, an upper side first screen 710, which is a real-time preview image, and a lower side second screen 720 may be displayed, as illustrated in a screen 700. For example, the first screen 710 may indicate an image captured by the rear camera, e.g., the camera positioned on the rear surface of the electronic device and configured to capture an image of a portion disposed forward of the electronic device, and the second screen 720 may indicate an image captured by the front camera, e.g., the camera positioned on the front surface of the electronic device and configured to capture an image of a portion disposed rearward of the electronic device. However, various embodiments are not limited thereto. The angles of view or positions of the cameras indicating the first and second screens 710 and 720 may be changed depending on the setting and may be variously changed in accordance with the touch input.

According to an embodiment, the processor 220 may display the preview screens of the images, which are captured by the plurality of available cameras (e.g., the first camera 231, the second camera 232, and the third camera 233 in FIG. 2) in the simultaneous image capturing mode, in the form of icons or thumbnails, e.g., as illustrated in FIG. 6. Therefore, the user may check the preview images of the images captured by the plurality of cameras and select the two or more cameras.

According to an embodiment, if the image capturing icon is selected in the state in which the screen 700 is displayed, image capturing processes may be simultaneously performed by the camera (e.g., the first camera 231) for capturing the preview image of the first screen 710 illustrated in the screen 700 and the camera (e.g., the third camera 233) for capturing the preview image of the second screen 720.

According to an embodiment, the user may select the three cameras to be used in the simultaneous image capturing mode by the sliding input. For example, when the user selects a specific video (e.g., the second video 612 as illustrated in FIG. 6) in response to a sliding input, slides the specific video, and releases the specific video in a specific region (e.g., a region indicated by a number 1, 2, 3, 4, 5, 6, 7, 8 or 9) as illustrated in the screen 700, a region of the first screen 710 and/or the second screen 720 may be divided as illustrated in a screen 701, 702, 703, 704, 705, 706, 707, 708 or 709 based on a position of the specific region where the specific video is released, and the specific video may be displayed on a divided region.

Figure 8:
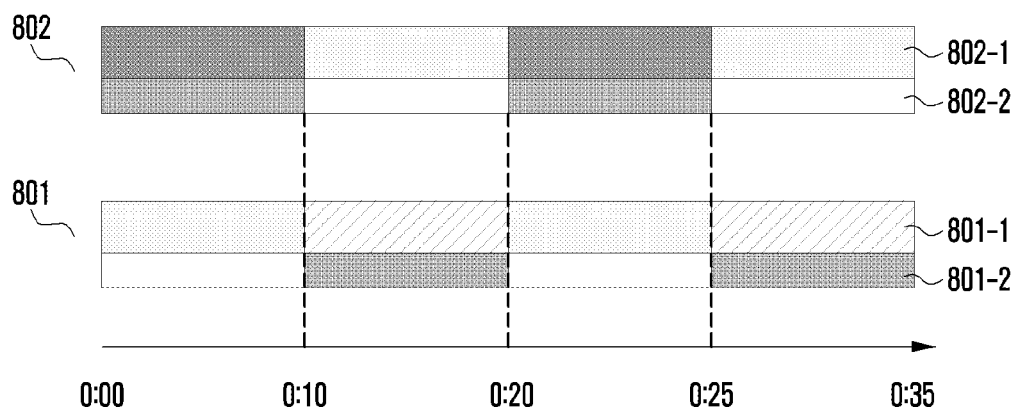
FIG. 8 is a diagram for explaining an example in which a plurality of videos of the electronic device are stored in a plurality of files according to various embodiments.

FIG. 8 is a diagram for explaining a plurality of images files simultaneously captured and stored in accordance with the simultaneous image capturing mode of the electronic device (e.g., the electronic device 200 in FIG. 2A or 2B) according to various embodiments.

With reference to FIG. 8, the videos acquired by the two or more cameras in accordance with the simultaneous image capturing mode may be stored as first and second files 801 and 802 that are independent files having the same time information. The first file 801 and the second file 802 may comprise time lengths including the same start point in time and the same end point in time. For example, the first file 801 and the second file 802 may have the same length of 35 seconds, and the image capturing start point in time and the end point in time may be coincident with each other. The first file 801 may include a single video track 801-1 and a single audio track 801-2, and the second file 802 may include a single video track 802-1 and a single audio track 802-2. For example, when the image capturing start point in time of the first file 801 is Jun. 29, 2021, 12:35:35 and the time length of the first file is 35 seconds, the image capturing start point in time of the second file 802 may also equally be Jun. 29, 2021, 12:35:35 and the time length of the second file 802 may also equally be 35 seconds.

According to an embodiment, the first file 801 and the second file 802 may each store, as additional file information, image capturing information on the respective images, for example, view angle information, information on the position of the camera, and information such as a delimiter or identifier indicating interrelationships of the files.

Figure 9:
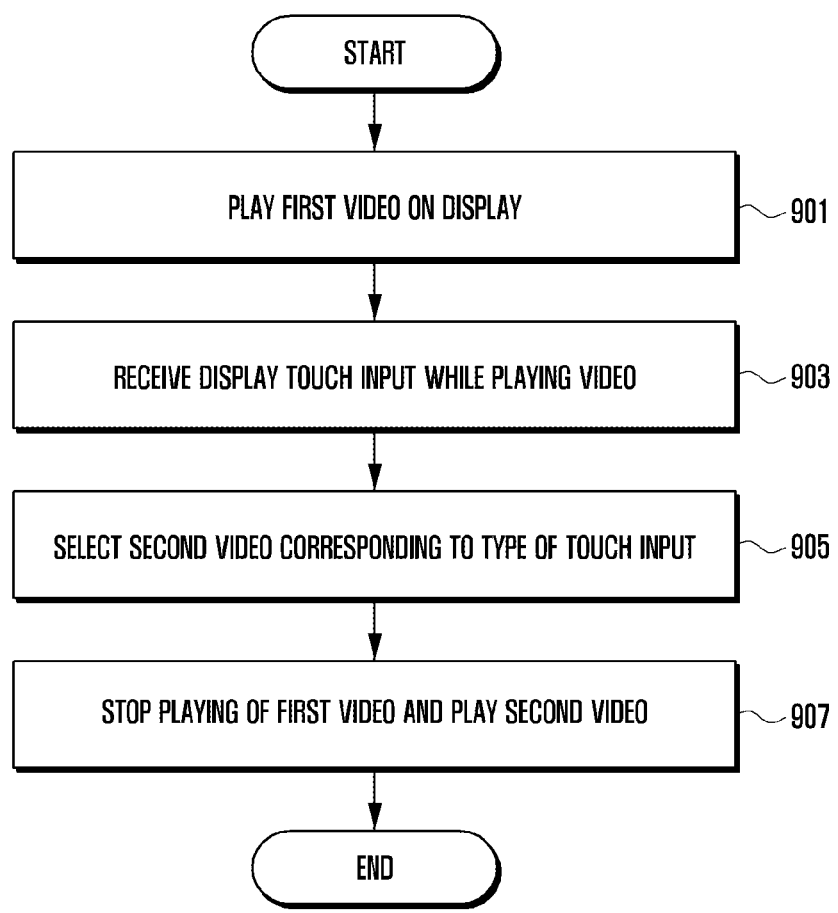
FIG. 9 is a flowchart illustrating an example method of changing and playing a plurality of videos of the electronic device according to various embodiments.

FIG. 9 is a flowchart illustrating an example method of changing and playing a plurality of videos by the electronic device (e.g., the electronic device 200 in FIG. 2A or 2B) according to various embodiments.

According to various embodiments, in operation 901, the processor (e.g., the processor 220 in FIG. 2) of the electronic device 200 may play the first video through the display (e.g., the display 240 in FIG. 2) in response to a request to play the first video among the plurality of videos which are simultaneously captured and have the same time information (e.g., the same start point in time and the same end point in time).

According to various embodiments, in operation 903, the processor 220 may receive a touch input on the display 240 while playing the first video. For example, the touch inputs may include various types of touch inputs such as a swipe, zoom-in (e.g., an operation of making a touch with two fingers and spreading the two fingers so that the two fingers move away from each other), zoom-out (e.g., an operation of making a touch with two fingers and retracting the two fingers so that the two fingers move toward each other), or double clicks.

According to various embodiments, the processor 220 may determine the type of touch input received in operation 905 and select the second video corresponding to the type of touch input among the plurality of videos. For example, when the touch input is determined as a zoom-in operation, the processor 220 may select a video having an angle of view narrower by one level than the angle of view of the first video. For example, when the touch input is determined as a zoom-out operation, the processor 220 may select a video having an angle of view wider by one level than the angle of view of the first video. For example, when the touch input is determined as a swipe operation, the processor 220 may select a video shot by the camera disposed at a position different from the position of the first video. For example, when the touch input is determined as the swipe operation, the processor 220 may select a video shot by the camera disposed at a position opposite to the position of the first video, e.g., select a video shot by the front camera disposed at a different position from the rear camera.

According to various embodiments, in operation 907, the processor 220 may stop the playing of the first video and play the second video. In this case, the second video is not played from the start point in time but may begin to be played from a point in time corresponding to the playing time information at the point in time at which the playing of the first video is stopped.

Figure 10:
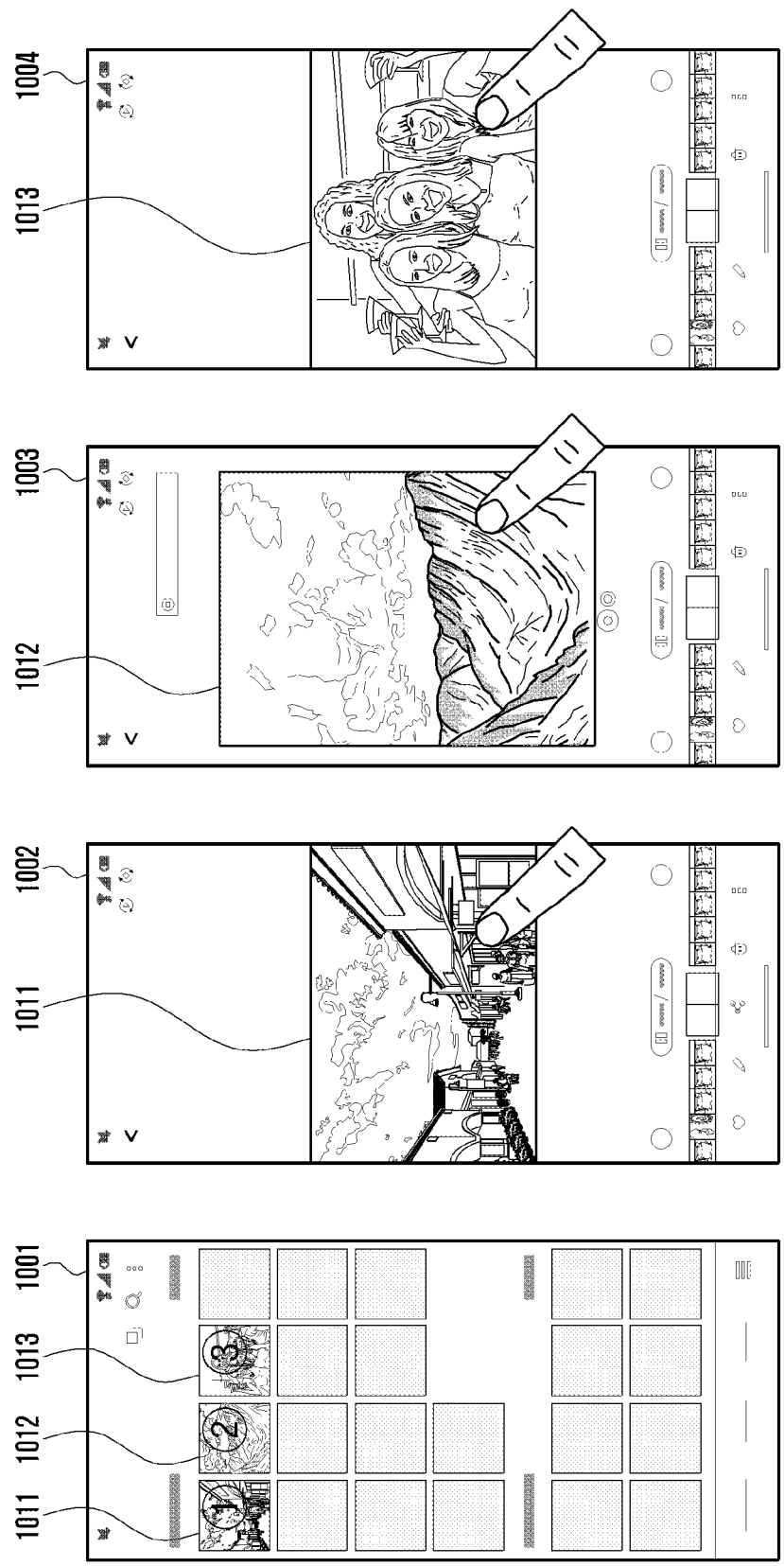
FIGS. 10, 11, 12, 13A, and 13B are diagrams illustrating examples of user interfaces for changing and playing a plurality of videos of the electronic device according to various embodiments.

FIG. 10 is a diagram illustrating examples of user interfaces for changing and playing a plurality of videos of the electronic device (e.g., the electronic device 200 in FIG. 2A or 2B) according to various embodiments.

According to an embodiment, for example, when a gallery application is executed to play the video in the electronic device 200, thumbnails of the videos may be displayed as illustrated in a screen 1001.

According to an embodiment, as the video play application is executed, the screen 1001 may display information that enables the user to know that the videos are related to one another, for example, videos 1011, 1012, and 1013 having the same time information having the same start point in time and the same end point in time are related to one another. For example, the first video 1011, the second video 1012, and the third video 1013 may be indicated by serial numbers (e.g., 1, 2, and 3).

According to an embodiment, in the screen 1001 of the video play application, the first video 1011 is selected by the touch input, for example, such that the first video 1011 may be played on the screen 1001.

According to an embodiment, when the screen 1002 on which the first video 1011 is played receives a touch input (e.g., swipe), the playing of the first video 1011 may be stopped in response to the touch input, and the second video 1012 may be subsequently played based on the same time information. For example, the playing time at the point in time at which the playing of the first video 1011 is stopped may be equal to the playing time at the point in time at which the second video 1012 begins to be played.

According to an embodiment, when the screen 1003 on which the second video 1012 is played receives a touch input (e.g., swipe), the playing of the second video 1012 may be stopped in response to the touch input, and the third video 1013 may be subsequently played on the screen 1003 based on the same time information. For example, the playing time at the point in time at which the playing of the second video 1012 is stopped may be equal to the playing time at the point in time at which the third video 1013 begins to be played.

According to an embodiment, depending on a swipe direction, the video is changed to the next video so that the next video is played, or the video is changed to the previous video so that the previous video is played. For example, the next video may be continuously played as a swipe input is received to the right and the number of the video increases, and the previous video may be continuously played as a swipe input is received to the left. In addition, when the swipe input is received again after the video is changed to a final video in response to the swipe input, the video is changed to an initial video, and the initial video may be continuously played.

Figure 11:
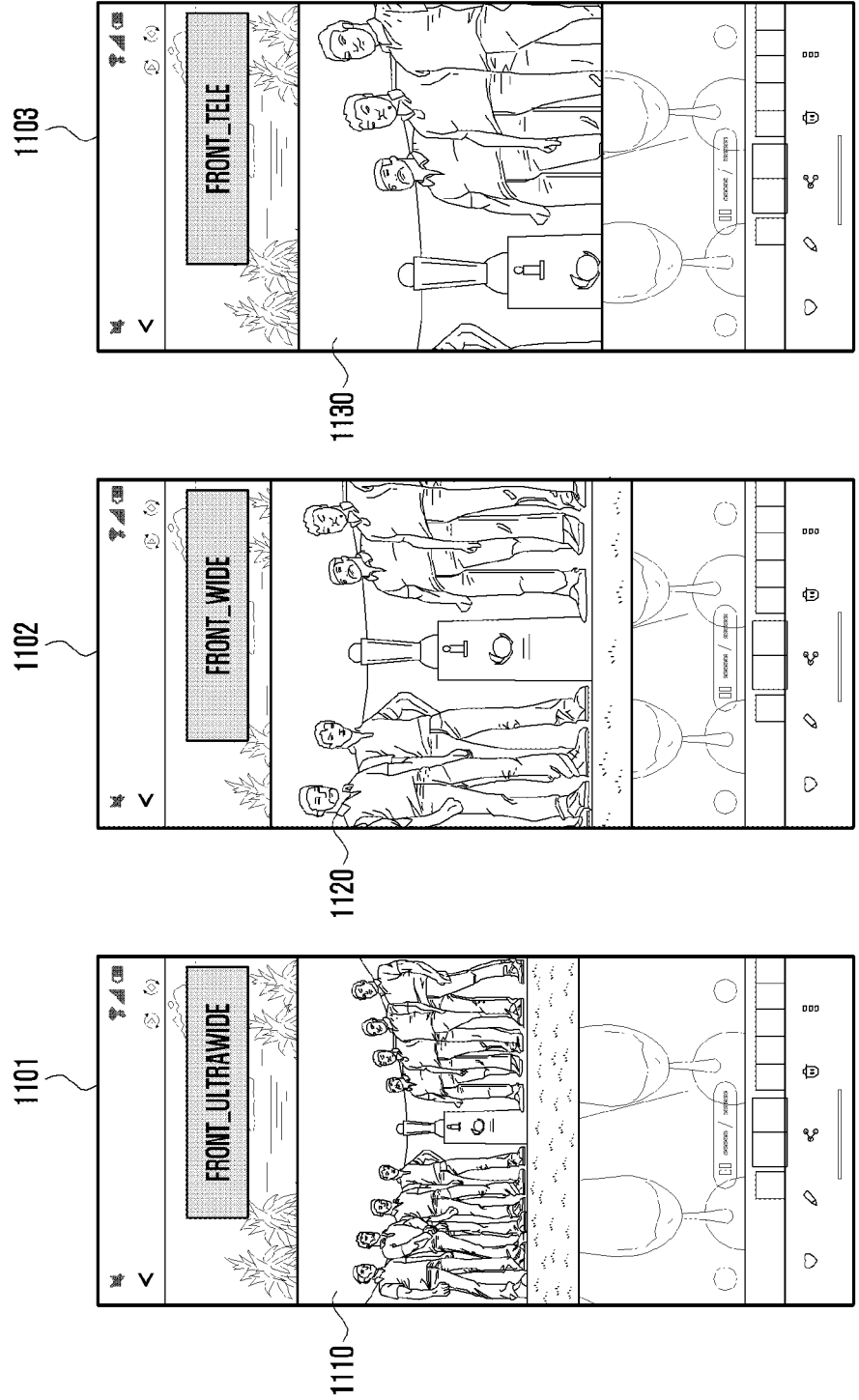

FIG. 11 is a diagram illustrating examples of user interfaces for changing and playing a plurality of videos of the electronic device (e.g., the electronic device 200 in FIG. 2A or 2B) according to various embodiments.

According to an embodiment, when the video play application is executed in the electronic device 200, a first video 1110 may be selected from the relevant videos (e.g., the first video 1110, a second video 1120, and a third video 1130) having the same time information, such that the first video 1110 may be played as illustrated in a screen 1101.

According to an embodiment, the electronic device 200 may ascertain, based on the additional file information, that the first video 1110 is an image captured by the camera (e.g., the first camera 231 in FIG. 2), which is an ultra-wide-angle camera positioned at the front side, the second video 1120 is an image captured by the camera (e.g., the second camera 232 in FIG. 2), which is a wide-angle camera positioned at the front side, and the third video 1130 is an image captured by the camera (e.g., the third camera 233 in FIG. 2) which is a telephoto camera positioned at the front side.

According to an embodiment, for example, when a zoom-in touch input is generated and received on the screen 1101 of the video play application on which the first video 1110 is played, the electronic device 100 may change the playing of the video to the playing of the second video 1120 shot by the second camera 232 having the angle of view smaller by one level than the angle of view of the first video 1110 based on the playing time information of the first video 1110. Therefore, the playing of the first video 1110 may be stopped at the point in time of the touch input, and the second video 1120 may be played at a playing point in time corresponding to the playing point in time of the point in time of the touch input.

According to an embodiment, for example, if a zoom-in touch input is generated and received on a screen 1102 of the video play application on which the second video 1120 is played, the electronic device 100 may change the playing of the video to the playing of the third video 1130 shot by the third camera 233 having the angle of view smaller by one level than the angle of view of the second video 1120 based on the playing time information of the second video 1120. Therefore, the playing of the second video 1120 may be stopped at the point in time of the touch input, and the third video 1130 may be played at a playing point in time corresponding to the playing point in time of the point in time of the touch input.

According to an embodiment, for example, when a zoom-out touch input is generated and received on a screen 1103 of the video play application on which the third video 1130 is played, the electronic device 100 may change the playing of the video to the playing of the second video 1120 captured by the second camera 232 having the angle of view larger by one level than the angle of view of the third video 1130 based on the playing time information of the third video 1130. Therefore, the playing of the third video 1130 may be stopped at the point in time of the touch input, and the second video 1120 may be played at a playing point in time corresponding to the playing point in time of the point in time of the touch input.

According to an embodiment, for example, when a zoom-out touch input is generated and received on the screen 1102 of the video play application on which the second video 1120 is played, the electronic device 100 may change the playing of the video to the playing of the first video 1110 captured by the first camera 231 having the angle of view larger by one level than the angle of view of the second video 1120 based on the playing time information of the second video 1120. Therefore, the playing of the second video 1120 may be stopped at the point in time of the touch input, and the first video 1110 may begin to be played at a playing point in time corresponding to the playing point in time of the point in time of the touch input.

Figure 12:
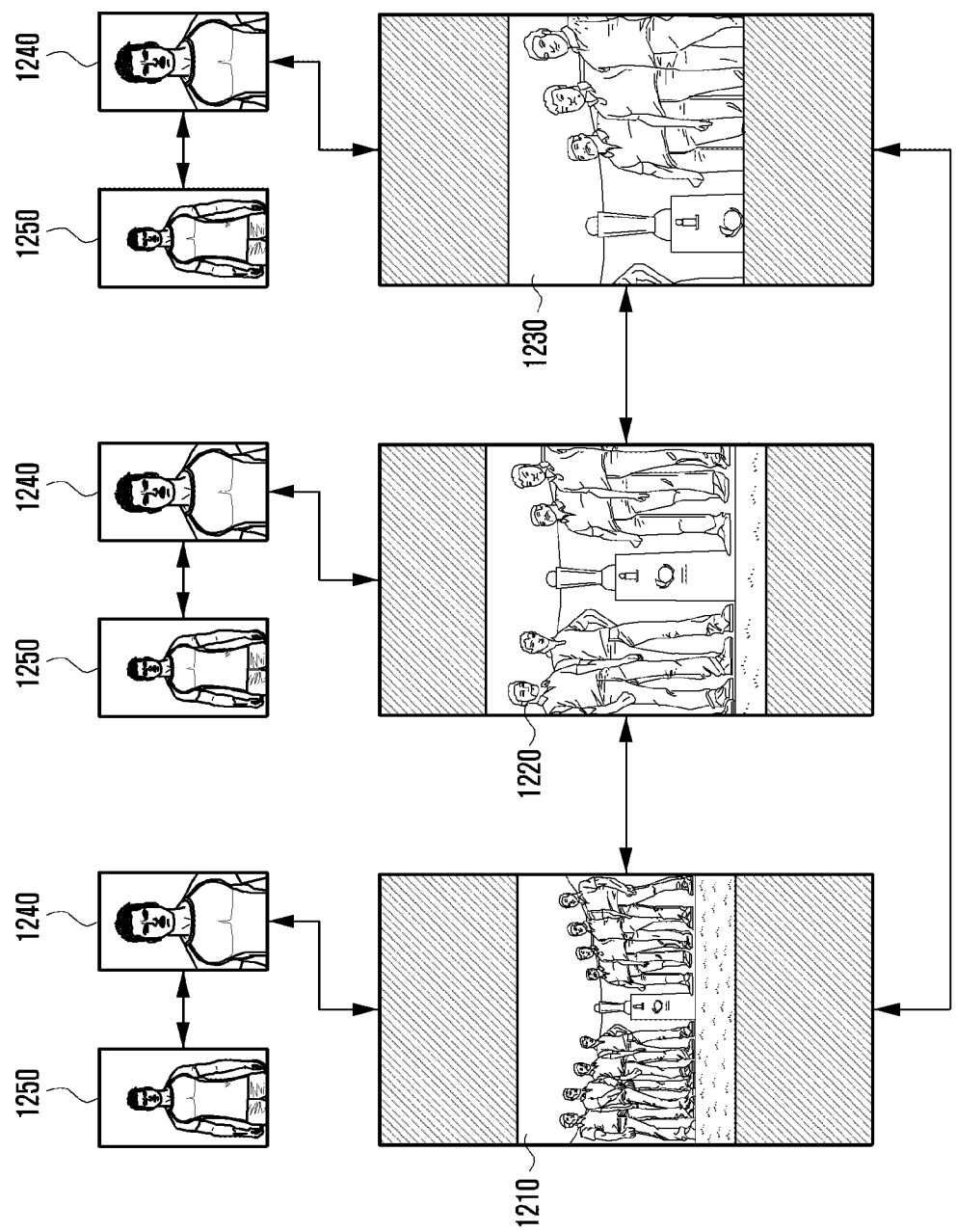

FIG. 12 is a diagram for explaining a method of changing and playing a plurality of videos of the electronic device (e.g., the electronic device 200 in FIG. 2A or 2B) according to various embodiments.

According to an embodiment, the electronic device 200 may change the playing video to a video having corresponding camera information in accordance with the type of touch input inputted to the screen on which the playing video is displayed among relevant videos (e.g., a first video 1210, a second video 1220, a third video 1230, a fourth video 1240, and a fifth video 1250) having the same time information in the video play application.

According to an embodiment, when the video play application is executed in the electronic device 200, the first video 1210 may be selected from the relevant videos (e.g., the first video 1210, the second video 1220, the third video 1230, the fourth video 1240, and the fifth video 1250) having the same time information, and the first video 1210 may be played.

According to an embodiment, the electronic device 200 may ascertain, based on the additional file information, that the first video 1110 is an image captured by a front camera (e.g., the first camera 231 in FIG. 2), which is an ultra-wide-angle camera, the second video 1120 is an image captured by a front camera (e.g., the second camera 232 in FIG. 2), which is a wide-angle camera, and the third video 1130 is an image captured by a front camera (e.g., the third camera 233 in FIG. 2) which is a telephoto camera. In addition, the electronic device 200 may ascertain, based on the additional file information, that the fourth video 1240 is an image captured by a rear camera, which is a wide-angle camera, and the fifth video 1250 is an image captured by a rear camera which is an ultra-wide-angle camera.

According to an embodiment, for example, when a zoom-in touch input is generated and received on the screen of the video play application on which the first video 1210 is played, the electronic device 100 may change the playing of the video to the playing of the second video 1220 shot by the second camera 232 having the angle of view smaller by one level than the angle of view of the first video 1210 based on the playing time information of the first video 1210. Therefore, the playing of the first video 1210 may be stopped at the point in time of the touch input, and the second video 1220 may be played at a playing point in time corresponding to the playing point in time of the point in time of the touch input.

According to an embodiment, for example, when a zoom-in touch input is generated and received again within a predetermined (e.g., specified) time after the zoom-in touch input is generated and received on the screen of the video play application on which the first video 1210 is played or when a finger motion or time according to the zoom-in touch input exceeds a predetermined limit point, the electronic device 100 may change the playing of the video to the playing of the third video 1230 shot by the third camera 233 having the angle of view smaller by two levels than the angle of view of the first video 1210 based on the playing time information of the first video 1210. Therefore, the playing of the first video 1210 may be stopped at the point in time of the touch input, and the third video 1230 may be played at a playing point in time corresponding to the playing point in time of the point in time of the touch input.

According to an embodiment, for example, when a flip or swipe touch input is generated and received on the screen of the video play application on which the first video 1210 is played, the electronic device 100 may change the playing of the video to the playing of the fourth video 1240 shot by a predetermined camera, e.g., a wide-angle rear camera having different position information from the first video 1210 based on the playing time information of the first video 1210. Therefore, the playing of the first video 1210 may be stopped at the point in time of the touch input, and the fourth video 1240 may be played at a playing point in time corresponding to the playing point in time of the point in time of the touch input.

According to an embodiment, for example, when a zoom-out touch input is generated and received on the screen of the video play application on which the fourth video 1240 is played, the electronic device 100 may change the playing of the video to the playing of the fifth video 1250 shot by the fifth camera having the angle of view larger by one level than the angle of view of the fourth video 1240 and having the same position information as the fourth video 1240 based on the playing time information of the fourth video 1240. Therefore, the playing of the fourth video 1240 may be stopped at the point in time of the touch input, and the fifth video 1250 may be played at a playing point in time corresponding to the playing point in time of the point in time of the touch input.

According to an embodiment, for example, when a zoom-in touch input is generated and received on the screen of the video play application on which the second video 1220 is played, the electronic device 100 may change the playing of the video to the playing of the third video 1230 shot by the third camera 233 having the angle of view smaller by one level than the angle of view of the second video 1220 based on the playing time information of the second video 1220. Therefore, the playing of the second video 1220 may be stopped at the point in time of the touch input, and the third video 1230 may be played at a playing point in time corresponding to the playing point in time of the point in time of the touch input.

According to an embodiment, for example, when a flip or swipe touch input is generated and received on the screen of the video play application on which the second video 1220 is played, the electronic device 100 may change the playing of the video to the playing of the fourth video 1240 shot by a predetermined camera, e.g., a wide-angle rear camera having different position information from the second video 1220 based on the playing time information of the second video 1220. In addition, for example, when a zoom-out touch input is generated and received on the screen of the video play application on which the fourth video 1240 is played, the electronic device 100 may change the playing of the video to the playing of the fifth video 1250 shot by the fifth camera having the angle of view larger by one level than the angle of view of the fourth video 1240 and having the same position information as the fourth video 1240 based on the playing time information of the fourth video 1240.

According to an embodiment, for example, when a zoom-out touch input is generated and received on a screen 1203 of the video play application on which the third video 1230 is played, the electronic device 100 may change the playing of the video to the playing of the second video 1220 captured by the second camera 232 having the angle of view larger by one level than the angle of view of the third video 1230 based on the playing time information of the third video 1230. Therefore, the playing of the third video 1130 may be stopped at the point in time of the touch input, and the second video 1220 may be played at a playing point in time corresponding to the playing point in time of the point in time of the touch input.

According to an embodiment, for example, when a zoom-out touch input is generated and received on the screen of the video play application on which the second video 1220 is played, the electronic device 100 may change the playing of the video to the playing of the first video 1210 captured by the first camera 231 having the angle of view larger by one level than the angle of view of the second video 1220 based on the playing time information of the second video 1220. Therefore, the playing of the second video 1220 may be stopped at the point in time of the touch input, and the first video 1210 may begin to be played at a playing point in time corresponding to the playing point in time of the point in time of the touch input.

According to an embodiment, for example, when a zoom-out touch input is generated and received again within a predetermined time after the zoom-out touch input is generated and received on the screen of the video play application on which the first video 1210 is played or when a finger motion or time according to the zoom-in touch input exceeds a predetermined limit point, the electronic device 100 may change the playing of the video to the playing of the first video 1210 shot by the first camera 231 having the angle of view larger by two levels than the angle of view of the third video 1230 based on the playing time information of the third video 1230.

Figure 13A:
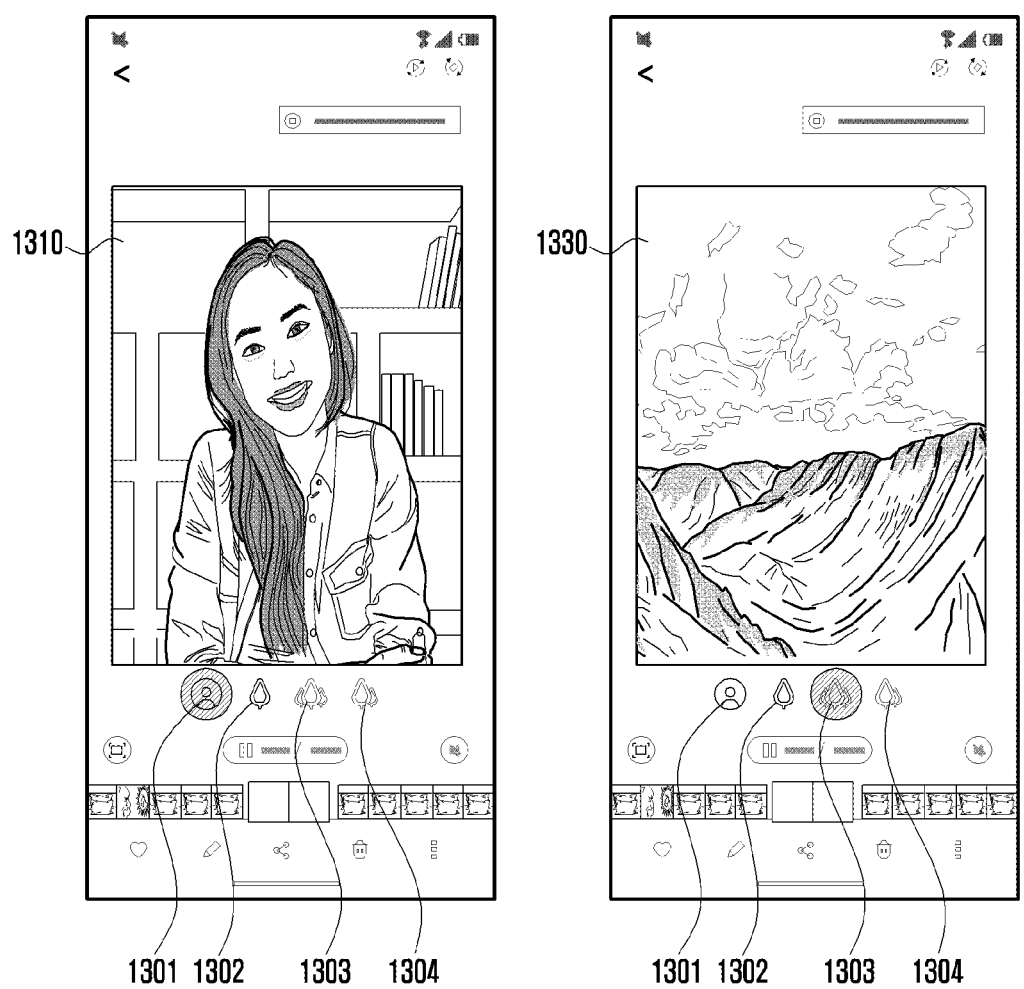
Figure 13B:
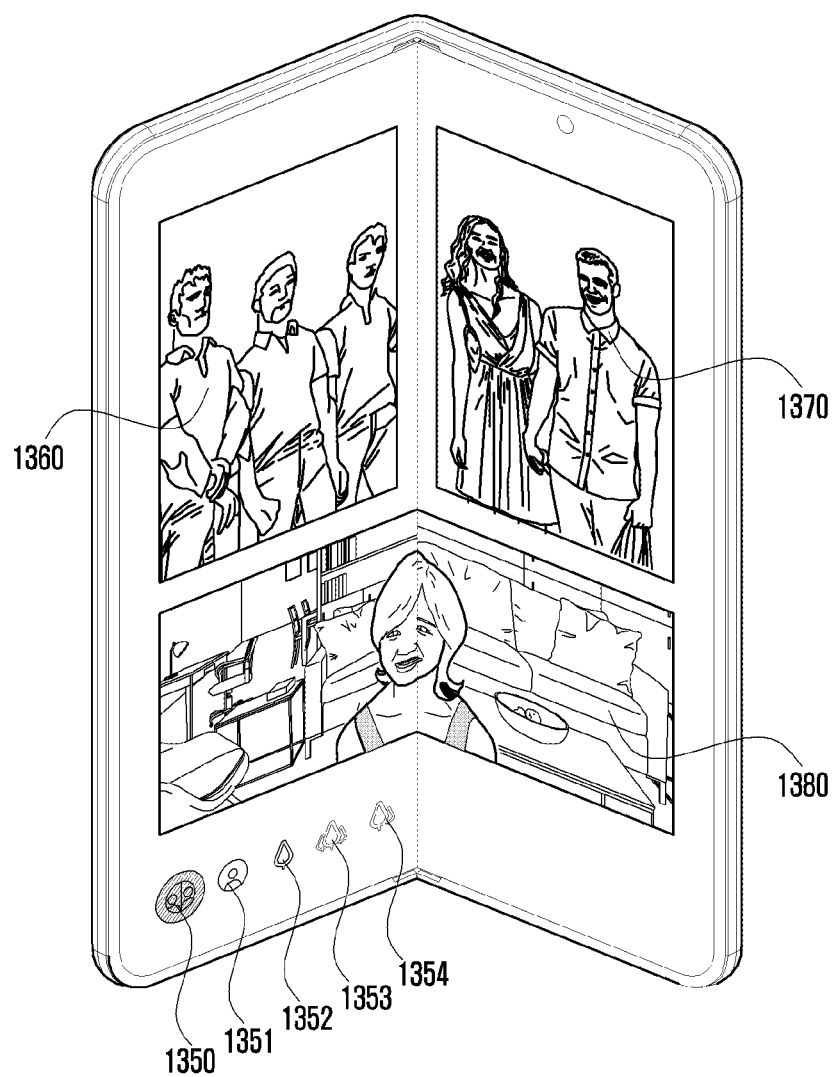

FIGS. 13A and 13B are diagrams for explaining a method of changing and playing a plurality of videos of the electronic device (e.g., the electronic device 200 in FIG. 2A or 2B) according to various embodiments.

According to an embodiment, the electronic device 200 may provide selectable icons corresponding to camera information on the screen on which the playing video is displayed among relevant videos (e.g., a first video 1310, a second video (not illustrated), a third video 1320, and a fourth video (not illustrated)) having the same time information in the video play application.

According to an embodiment, for example, the icons provided by the electronic device 200 may include a first icon 1301 for playing the first video 1310 shot by a rear camera, a second icon 1302 for playing the second video (not illustrated) shot by a front telephoto camera, a third icon 1303 for playing the third video 1330 shot by a front ultra-wide-angle camera, and a fourth icon 1304 for playing the fourth video (not illustrated) shot by a front wide-angle camera. The number of icons and the shape or position of the icon are not limited to the present embodiment but may be variously changed.

According to an embodiment, when the touch input is applied to one of the icons, the electronic device 200 may play a video corresponding to the icon. For example, when the first icon 1301 is selected, the electronic device 200 may play the first video 1310. When the third icon 1303 is touched while the first video 1310 is played, the electronic device 200 may play the third video 1330 at the same playing point in time based on the playing time information of the first video 1310.

FIG. 13B is a diagram for explaining a method of changing and playing a plurality of videos of the electronic device (e.g., the foldable electronic device 200 in FIG. 2B) according to various embodiments.

According to an embodiment, the electronic device 200 may provide selectable icons corresponding to camera information on the screen on which the playing video is displayed among relevant videos (e.g., a first video 1310, a second video (not illustrated), a third video 1320, and a fourth video (not illustrated)) having the same time information in the video play application.

According to an embodiment, for example, the icons provided by the electronic device 200 may include a second icon 1351 for playing at least one of the first video 1360, the second video 1370, and/or the third video 1380 shot by at least one (e.g., the front camera 201, the rear camera 202, and/or the internal camera 203 in FIG. 2B) of the plurality of cameras, a third icon 1352 for playing the third video (not illustrated) shot by a front telephoto camera, a fourth icon 1353 for playing the fourth video (not illustrated) shot by a front ultra-wide-angle camera, and a fifth icon 1354 for playing the fifth video (not illustrated) shot by the front wide-angle camera.

According to an embodiment, for example, the icons provided by the electronic device 200 may include a first icon 1350 for simultaneously playing the first video 1360, the second video 1370, and the third video 1380 shot by the plurality of cameras (e.g., the front camera 201, the rear camera 202, and/or the internal camera 203 in FIG. 2B). When the first icon 1350 is selected, the electronic device 200 may simultaneously play the corresponding videos on the multiple screens, for example. In this case, based on additional information (e.g., image capturing positions, angles, and/or directions) on the respective videos and the number of videos, the electronic device 200 may divide the screen into the multiple screens on which the videos are played, respectively, and allow the respective videos to be disposed and played at the positions and/or in the directions of the divided screens. For example, the first video 1360 shot rearward in a left direction at 90 degrees may be disposed on a left divided screen at an upper side of the multiple screens, the second video 1370 shot rearward in a right direction at 90 degrees may be disposed on a right divided screen at the upper side of the multiple screens, and the third video 1380 shot forward may be disposed on a divided screen at a lower side of the multiple screens. Meanwhile, the positions and sizes of the respective videos disposed on the multiple screens may be changed in accordance with user selection. For example, when the second video 1370 (e.g., the image captured by the rear camera 202) is selected in the multiple screens and the icon for playing the image captured by the telephoto, ultra-wide-angle or wide-angle camera is selected, the video may be played at the selected divided screen position when the corresponding video is present. In addition, the electronic device 200 may display additional information on the positions, angles, and/or directions in which the videos are shot on the divided screens on which the respective videos are played, as texts (e.g., front left 90 degrees, front right 90 degrees, and the like), for example.

Figure 14:
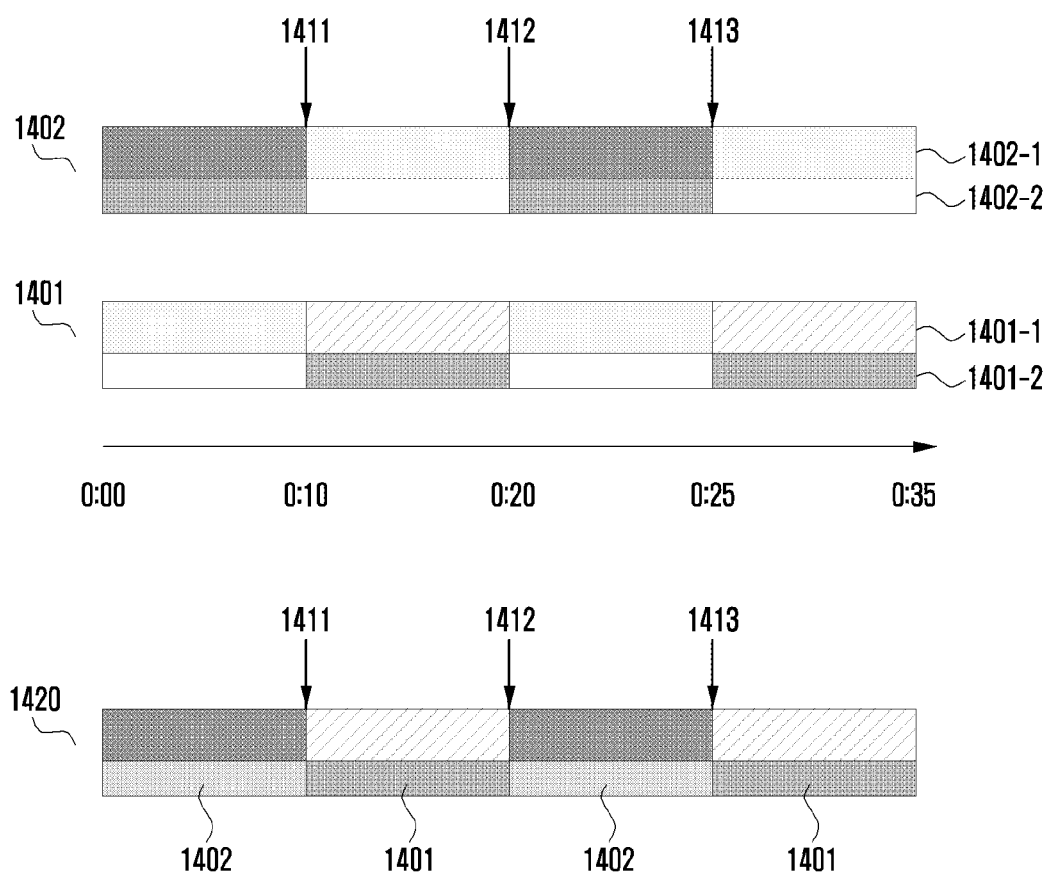
FIG. 14 is a diagram for explaining an example in which two videos are changed and played based on the same time flow from a plurality of video files of the electronic device according to various embodiments.

FIG. 14 is a diagram for explaining an example in which two videos are changed and played in accordance with the same time flow from a plurality of video files of the electronic device according to various embodiments.

With reference to FIG. 14, first and second files 1401 and 1402, which are independent files stored by being acquired through the two or more cameras in accordance with the simultaneous image capturing mode, may include the same time information of the time length including the same start point in time and the same end point in time. For example, the first file 1401 and the second file 1402 may have the same length of 35 seconds, and the image capturing start point in time and the end point in time may be coincident with each other. The first file 1401 may include a single video track 1401-1 and a single audio track 1401-2, and the second file 1402 may include a single video track 1402-1 and a single audio track 1402-2. For example, when the image capturing start point in time of the first file 1401 is Jun. 29, 2021, 12:35:35 and the time length of the first file is 35 seconds, the image capturing start point in time of the second file 1402 may also equally be Jun. 29, 2021, 12:35:35 and the time length of the second file may also equally be 35 seconds.

According to an embodiment, the first file 1401 and the second file 1402 may each store, as additional file information, image capturing information on the respective images, for example, view angle information, information on the position of the camera, and information such as a delimiter or identifier indicating interrelationships of the files, such that the first file 1401 and the second file 1402 may be indicated as the relevant files.

According to an embodiment, when a touch input 1411 such as swipe, zoom-in, or zoom-out occurs at a playing point in time of 10 seconds while an initial second video 1402 is played, currently playing contents 1420 may be changed from the second video 1402 to the first video 1401, and the first video 1401 may be played from a playing point in time of 10 seconds correspondingly to the playing point in time of 10 seconds of the second video 1402. In addition, when a touch input 1412 occurs at a playing point in time of 20 seconds while the first video 1401 is played, the currently playing contents 1420 may be changed from the first video 1401 to the second video 1402 again, and the second video 1402 may be played from a playing point in time of 20 seconds corresponding to the playing point in time of 20 seconds of the first video 1401. In addition, when a touch input 1413 occurs at a playing point in time of 25 seconds while the second video 1402 is played, the currently playing contents 1420 may be changed from the second video 1402 to the first video 1401 again, and the first video 1401 may be played from a playing point in time of 25 seconds correspondingly to the playing point in time of 25 seconds of the second video 1402. The touch input and the change in the playing of the video may be repeatedly performed within a length of the image, e.g., 35 seconds.

According to an embodiment, the electronic device (e.g., the electronic device 200 in FIG. 2A or 2B) includes the plurality of cameras (e.g., the first camera 231, the second camera 232, and the third camera 233 in FIG. 2), the display (e.g., the display 240 in FIG. 2) including the touch input sensor, the memory (e.g., the memory 210 in FIG. 2), and the at least one processor (e.g., the processor 220 in FIG. 2) operatively connected to the plurality of cameras, the display, and the memory. The processor may be set to display the preview images of the images, which are acquired by at least some of the plurality of cameras, on a part of the display screen, receive, through the touch input sensor, the touch input in the region in which the first image and the second image are displayed among the plurality of preview image, simultaneously acquire the first video and the second video using the first camera configured to acquire the preview image displayed in the first image and the second camera configured to acquire the preview image displayed in the second image region, and separately store the first video and the second video as the relevant first and second files having the same time information in the memory.

According to an embodiment, the touch inputs on the first and second image regions may include sliding inputs on the first and second image regions, and the processor may select the first and second cameras based on the position of the region in which the first and second image regions are slid and released in response to the sliding inputs.

According to an embodiment, the processor may divide the display screen based on the position of the region in which the third image region is slid and released in response to the sliding input on the region in which the third image is displayed among the plurality of preview images, and the processor may simultaneously acquire the third video together with the first and second videos using the third camera for acquiring the third image together with the first and second cameras.

According to an embodiment, the processor may allow the first and second files to include camera information on the first and second cameras, and the camera information may include the position information and the view angle information of the first and second cameras.

According to an example embodiment, an electronic device (e.g., the electronic device 200 in FIG. 2A or 2B) includes: a plurality of cameras (e.g., the first camera 231, the second camera 232, and the third camera 233 in FIG. 2), a display (e.g., the display 240 in FIG. 2) including a touch input sensor, a memory (e.g., the memory 210 in FIG. 2), and at least one processor (e.g., the processor 220 in FIG. 2) operatively connected to the plurality of cameras, the display, and the memory. The processor may be configured to: play a first video through the display based on the command to play the first video among plurality of relevant video files having a same time information stored in the memory, receive, through the touch input sensor, a touch input on the display configured to output the first video, determine a second video corresponding to the type of touch input among the plurality of relevant video files, stop the playing of the first video, and play the second video based on the playing time information of the stopped first video.

According to an example embodiment, the processor may be configured to determine the second video corresponding to the type of touch input based on the camera information of the plurality of video files.

According to an example embodiment, the camera information of the second video may include at least one of the position information and the view angle information of the camera that shot the second video.

According to an example embodiment, the type of touch input may include a swipe, zoom-in, or zoom-out touch input.

According to an example embodiment, the processor may be configured to determine the second video in accordance with the view angle information corresponding to the zoom-in or zoom-out touch input based on the camera information of the plurality of video files.

According to an example embodiment, the processor may be configured to determine the second video in accordance with the position information corresponding to the swipe touch input based on the camera information of the plurality of video files.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of creating a video of an electronic device including a plurality of cameras including a first camera and a second camera, the method comprising:
   displaying a plurality of preview images including a first image and a second image respectively acquired by the first camera and the second camera, on a part of a display screen;
   receiving a sliding touch input on each of the first image and a second image, the sliding touch input being released at a first region and a second region of the display screen;
   selecting the first camera and the second camera respectively related to each of the first image and the second image;
   simultaneously starting to acquire a first video and a second video respectively using the first camera and the second camera for acquiring the second camera;
   separately storing the first video and the second video as a first file and a second file having identical start point and end point in time after ending the acquiring of the first video and the second video.

2. The method of claim 1, further comprising displaying the first video and the second video at the first region and the second region respectively on which the sliding touch input is released.

3. The method of claim 2, wherein the display screen is divided based on a position on which a third image among the plurality of preview images is slid and released in response to a sliding input on a third image, and a third video is simultaneously acquired together with the first and second videos using a third camera for acquiring the third image together with the first and second cameras.

4. The method of claim 1, wherein the first and second files respectively include camera information on the first and second cameras, and the camera information comprises position information and view angle information of the first and second cameras.

5. A method of playing a video of an electronic device including a display and a plurality of cameras, the method comprising:
   playing a first video, acquired by a first camera of the plurality of cameras, through the display based on a command to play the first video among a plurality of relevant video files, acquired by at least some of the plurality of cameras, having identical time information;
   receiving a touch input on a region of the display outputting the first video;
   determining a second video among the plurality of relevant video files, acquired by a second camera of the plurality of cameras, corresponding to a type of touch input and a position of the touch input; and
   stopping the playing of the first video and playing the second video based on playing time information of the stopped first video.

6. The method of claim 5, wherein the second video corresponding to the type of touch input is determined based on camera information of the plurality of video files.

7. The method of claim 6, wherein the camera information of the second video comprises at least one of position information and view angle information of the camera that shot the second video.

8. The method of claim 7, wherein the type of touch input comprises a swipe, zoom-in, or zoom-out touch input.

9. The method of claim 8, wherein the second video is determined based on the view angle information corresponding to the zoom-in or zoom-out touch input based on the camera information of the plurality of video files.

10. The method of claim 8, wherein the second video is determined based on position information corresponding to the swipe touch input based on the camera information of the plurality of video files.

11. An electronic device comprising:
a plurality of cameras;
a display comprising a touch input sensor;
memory; and
at least one processor including processing circuitry operatively connected to the plurality of cameras, the display, and the memory,
wherein the memory stores instructions that, when executed by the at least one processor individually or collectively, cause the electronic device to:
display a plurality of preview images including a first image and a second image respectively acquired by the first camera and the second camera, on a part of a display screen;
receive a sliding touch input on each of the first image and a second image, the sliding touch input being released at a first region and a second region of the display screen;
select the first camera and the second camera respectively related to each of the first image and the second image;
simultaneously start to acquire a first video and a second video respectively using the first camera and the second camera;
separately store the first video and the second video as a first file and a second file having identical start point and end point in time after ending the acquiring of the first video and the second video.

12. The electronic device of claim 11, wherein the instructions, when executed by the at least one processor, further cause the electronic device to display the first video and the second video at the first region and the second region respectively on which the sliding touch input is released.

13. The electronic device of claim 11, wherein the instructions, when executed by the at least one processor, further cause the electronic device to divide the display screen based on a position on which a third image among the plurality of preview images is slid and released in response to a sliding input on the third image, and to simultaneously acquire a third video together with the first and second videos using a third camera for acquiring the third image together with the first and second cameras.

14. The electronic device of claim 11, wherein the instructions, when executed by the at least one processor, further cause the electronic device to generate the first and second files to respectively include camera information on the first and second cameras, wherein the camera information comprises position information and view angle information of the first and second cameras.

15. An electronic device comprising:
a plurality of cameras;
a display comprising a touch input sensor;
memory; and
at least one processor including processing circuitry operatively connected to the plurality of cameras, the display, and the memory,
wherein the memory stores instructions that, when executed by the at least one processor individually or collectively, cause the electronic device to:
play a first video, acquired by a first camera of the plurality of cameras, through the display based on a command to play the first video among a plurality of relevant video files having identical time information stored in the memory;
receive, via the touch input sensor, a touch input on the display configured to output the first video;
determine a second video among the plurality of relevant video files, acquired by a second camera of the plurality of cameras, corresponding to the type of touch input and a position of the touch input; and
stop the playing of the first video and play the second video based on playing time information of the stopped first video.

16. The electronic device of claim 15, wherein the instructions, when executed by the at least one processor, further cause the electronic device to determine the second video corresponding to the type of touch input based on camera information of the plurality of video files.

17. The electronic device of claim 16, wherein the camera information of the second video comprises at least one of position information and view angle information of the camera that shot the second video.

18. The electronic device of claim 17, wherein the type of touch input comprises a swipe, zoom-in, or zoom-out touch input.

19. The electronic device of claim 18, wherein the instructions, when executed by the at least one processor, further cause the electronic device to determine the second video based on the view angle information corresponding to the zoom-in or zoom-out touch input based on the camera information of the plurality of video files.

20. The electronic device of claim 18, wherein the instructions, when executed by the at least one processor, further cause the electronic device to determine the second video based on the position information corresponding to the swipe touch input based on the camera information of the plurality of video files.

* * * * *